(12) United States Patent
Yamashita et al.

(10) Patent No.: US 7,539,633 B1
(45) Date of Patent: May 26, 2009

(54) PARTS-MANAGEMENT SYSTEM, METHOD OF MANAGING PARTS AND PARTS-MANAGEMENT APPARATUS

(75) Inventors: Toshiyuki Yamashita, Tottori-Ken (JP); Masazumi Ito, Osaka (JP)

(73) Assignee: Minolta Co., Ltd., Osaka (JP)

(*) Notice: Subject to any disclaimer, the term of this patent is extended or adjusted under 35 U.S.C. 154(b) by 1156 days.

(21) Appl. No.: 09/662,176

(22) Filed: Sep. 14, 2000

(30) Foreign Application Priority Data

Sep. 20, 1999 (JP) ................... 11-265231

(51) Int. Cl.
*G06Q 10/00* (2006.01)

(52) U.S. Cl. .................. 705/28; 706/104; 235/385; 709/206

(58) Field of Classification Search .............. 705/28
See application file for complete search history.

(56) References Cited

U.S. PATENT DOCUMENTS

| | | | |
|---|---|---|---|
| 5,257,069 A | | 10/1993 | Hirata et al. |
| 5,819,288 A | * | 10/1998 | De Bonet .................. 707/2 |
| 5,847,814 A | * | 12/1998 | Antziopoulos et al. ...... 355/202 |
| 6,138,249 A | * | 10/2000 | Nolet ........................ 714/25 |
| 6,401,116 B1 | * | 6/2002 | Okigami ..................... 709/223 |

FOREIGN PATENT DOCUMENTS

| | | |
|---|---|---|
| JP | 6-35264 | 2/1994 |
| JP | 7-64451 | 3/1995 |
| JP | 7-66885 | 3/1995 |
| JP | 11-126008 | 5/1999 |

OTHER PUBLICATIONS

Japanese Office Action mailed on Sep. 16, 2008, directed to counterpart Japanese Patent Application No. H11-265231; 5 pages.

* cited by examiner

*Primary Examiner*—F. Zeender
*Assistant Examiner*—Luna Champagne
(74) *Attorney, Agent, or Firm*—Morrison & Foerster LLP

(57) ABSTRACT

A parts-management system includes a terminal apparatus and a management apparatus for communicating with the terminal apparatus. The terminal apparatus includes a first memory which stores identification information of each part used in the terminal apparatus and an operation value corresponding to an operation of each part in a mutually related manner, a controller which performs a predetermined operation processing corresponding to an operation of each part and updates the operation value stored in the memory when the part operates, a first transmitter which transmits the identification information of each part and an operation value corresponding to the identification information to the management apparatus, and a second transmitter which transmits a request signal for requesting a transmission of an operation value for at least one part. The management apparatus includes a second memory which stores the identification information of each part and the operation value each sent by the first transmitter in a mutually related manner, and a third transmitter which transmits the identification information and the operation value each stored in the second memory to the terminal apparatus in response to the request signal.

11 Claims, 26 Drawing Sheets

|  | PART ID | INTEGRATING COUNTER | INTEGRATING TIMER |
|---|---|---|---|
| Dram-top | 0000 | 00000005 | 00000000 |
|  | 0004 | 00000003 | 00000000 |
|  | 0101 | 00000000 | 00000000 |
|  | 0102 | 00000000 | 00000000 |
|  | ⋮ |  |  |
|  |  |  |  |
|  | 7FFF | 00000111 | 00000000 |
|  | 8000 | 00000000 | 00000005 |
|  | 8003 | 00000000 | 00000007 |
|  | 9005 | 00000000 | 00000000 |
|  | 00A1 | 00000000 | 00000000 |
|  | FFFF |  |  |
|  |  |  |  |
|  |  |  |  |
|  |  |  |  |
|  |  |  |  |
|  |  |  |  |
|  |  |  |  |
|  |  |  |  |
|  |  |  |  |
| Dram-bottom |  |  |  |

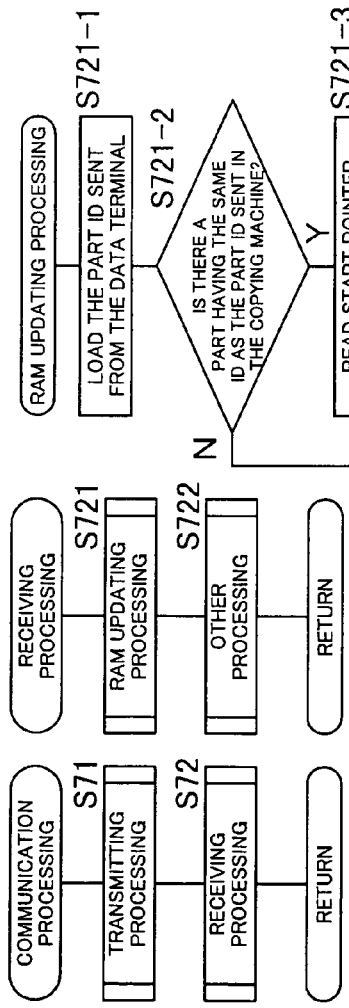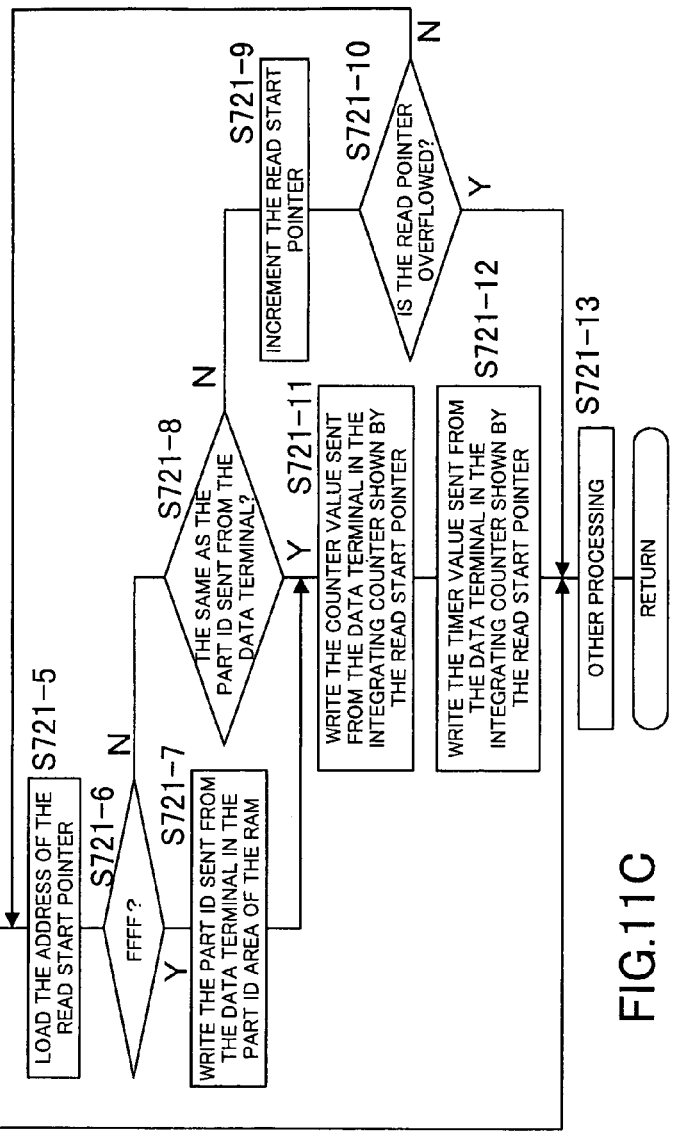
FIG.11A  FIG.11B  FIG.11C

|  | PART ID | RECEIVED DATA FROM THE COPYING MACHINE | | RECEIVED DATA FROM THE CENTER | |
|---|---|---|---|---|---|
|  |  | INTEGRATING COUNTER | INTEGRATING TIMER | RECEIVING COUNTER | RECEIVING TIMER |
| Dram-top | 0000 | 00000005 | 00000000 | 00000000 | 00000000 |
|  | 0004 | 00000003 | 00000000 | 00000000 | 00000000 |
|  | 0101 | 00000000 | 00000000 | 00001000 | 00000000 |
|  | 0102 | 00000000 | 00000000 | 00000200 | 00000000 |
|  | FFFF |  |  |  |  |
|  | ⋮ |  |  |  |  |
|  | 7FFF | 00000111 | 00000000 | 00000000 | 00000000 |
|  | 8000 | 00000000 | 00000005 | 00000000 | 00000000 |
|  | 8003 | 00000000 | 00000007 | 00000000 | 00000000 |
|  | 9005 | 00000000 | 00000000 | 00000000 | 00000008 |
|  | 90A1 | 00000000 | 00000000 | 00000000 | 00000100 |
|  | FFFF |  |  |  |  |
|  | ⋮ |  |  |  |  |
|  | ⋮ |  |  |  |  |
|  | ⋮ |  |  |  |  |
|  |  |  |  |  |  |
|  |  |  |  |  |  |
| Dram-bottom |  |  |  |  |  |

FIG.13

2 BYTE

| TxID-top | 0004 |
|---|---|
|  | 0011 |
|  |  |
|  |  |
|  |  |
|  |  |
|  |  |
|  |  |
|  |  |
| TxID-bottom |  |

FIG.14

|  | PART ID | INTEGRATING COUNTER | INTEGRATING TIMER |
|---|---|---|---|
| Dram-top | 0000 | 00000005 | 00000000 |
|  | 0002 | 00000008 | 00000000 |
|  | 0003 | 01001001 | 00000000 |
|  | 0004 | 00000003 | 00000000 |
|  | 00F8 | 01A8A485 | 0586243A |
|  | 0101 | 00000000 | 00000000 |
|  | 0102 | 00000000 | 00000000 |
|  | 0234 | 00000000 | 00000000 |
|  | 0245 | 00000000 | 00000000 |
|  | 7F00 | 00000000 | 00000000 |
|  | 7FFF | 00000111 | 00000000 |
|  | 8000 | 00000000 | 00000005 |
|  | 8001 | 00000000 | 0018A456 |
|  | 8003 | 00000000 | 00000007 |
|  | 8005 | 00000000 | 0000188A |
|  | 8008 | 00000000 | 000ABCDE |
|  | 8124 | 00000000 | 000CCDFA |
|  | 8234 | 00000000 | 000AABBC |
|  | 9005 | 00000000 | 00000000 |
|  | 90A1 | 00000000 | 00000000 |
|  | ABCD | 00000000 | 00000000 |
|  | ADF0 | 00000000 | 00000000 |
|  |  |  |  |
| Dram-bottom | FFFF |  |  |

FIG.20

(1) WHEN THE TERMINAL TRANSMITS (1-1) FORMAT AT THE TIME OF THE BACKUP DATA TRANSMISSION REQUEST

1st                2nd

(1-2) FORMAT AT THE TIME OF THE RECYCLE DATA TRANSMISSION

1st            2nd            3rd            4th

(1-3) FORMAT AT THE TIME OF THE PROHIBITION NOTICE

1st                2nd

(2) WHEN THE CENTER TRANSMITS (2-1) FORMAT AT THE TIME OF THE ALL PARTS DATA TRANSMISSION REQUEST

1st

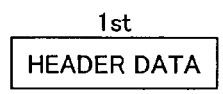

(2-2) FORMAT AT THE TIME OF THE SPECIFIED PARTS DATA TRANSMISSION REQUEST

1st                2nd

(2-3) FORMAT AT THE TIME OF THE BACKUP DATA TRANSMISSION

1st            2nd            3rd            4th

(2-4) FORMAT AT THE TIME OF THE LIFE VALUE TRANSMISSION

1st            2nd            3rd            4th

(3) WHEN THE CLEANING APPARATUS TRANSMITS (3-1) FORMAT AT THE TIME OF THE CLEANING TERMINATION SIGNAL

1st                2nd

FIG.21

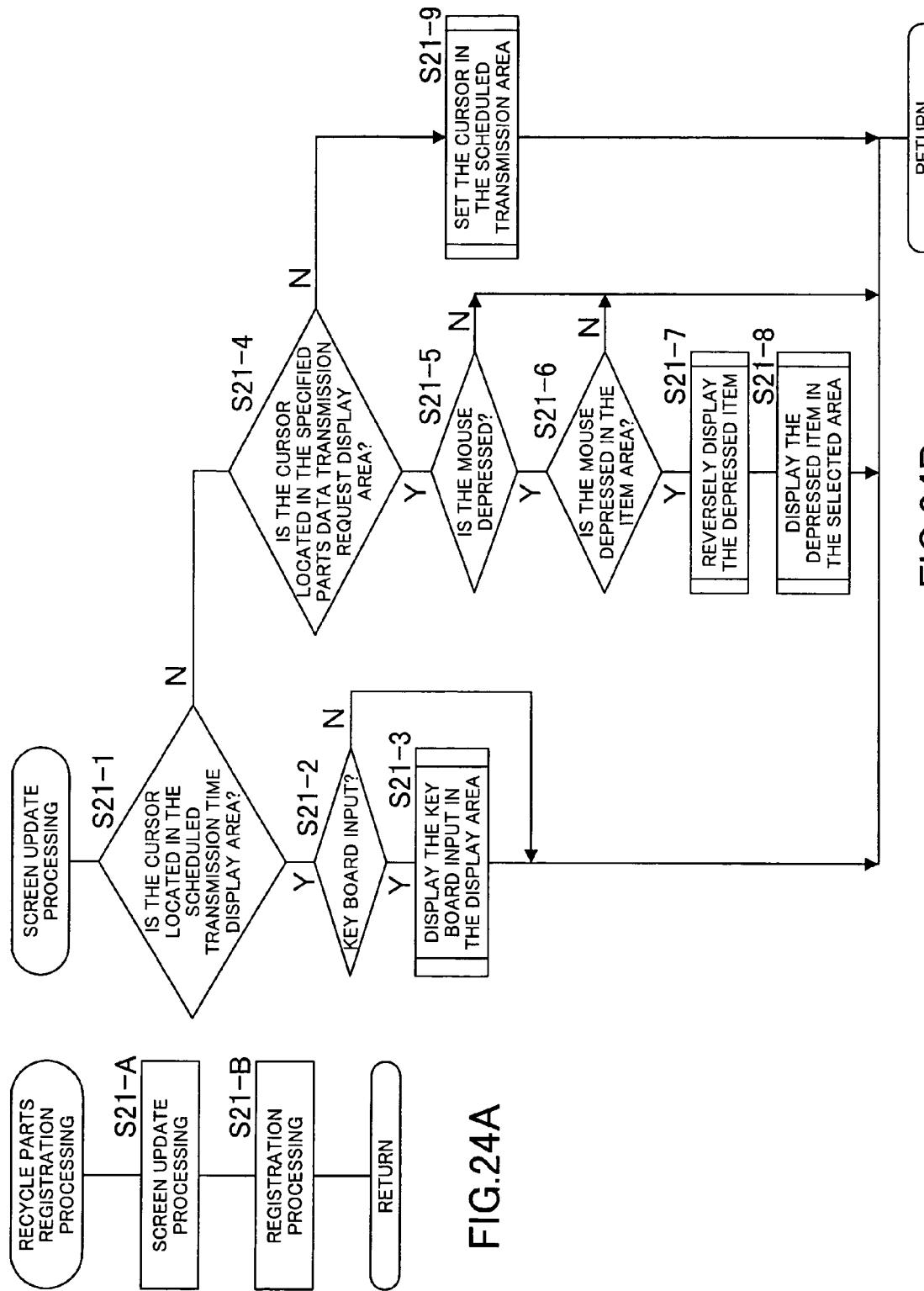

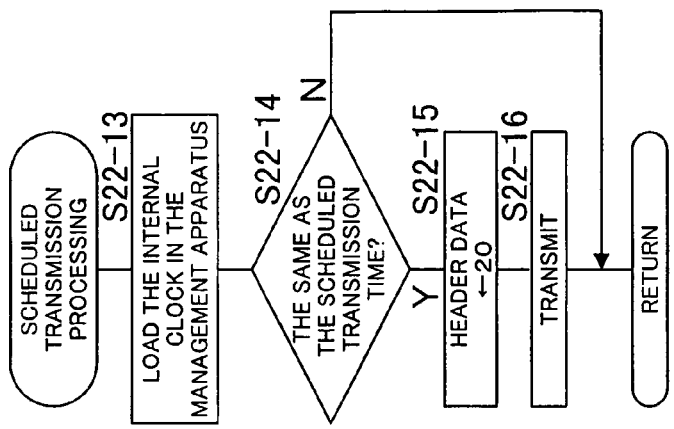
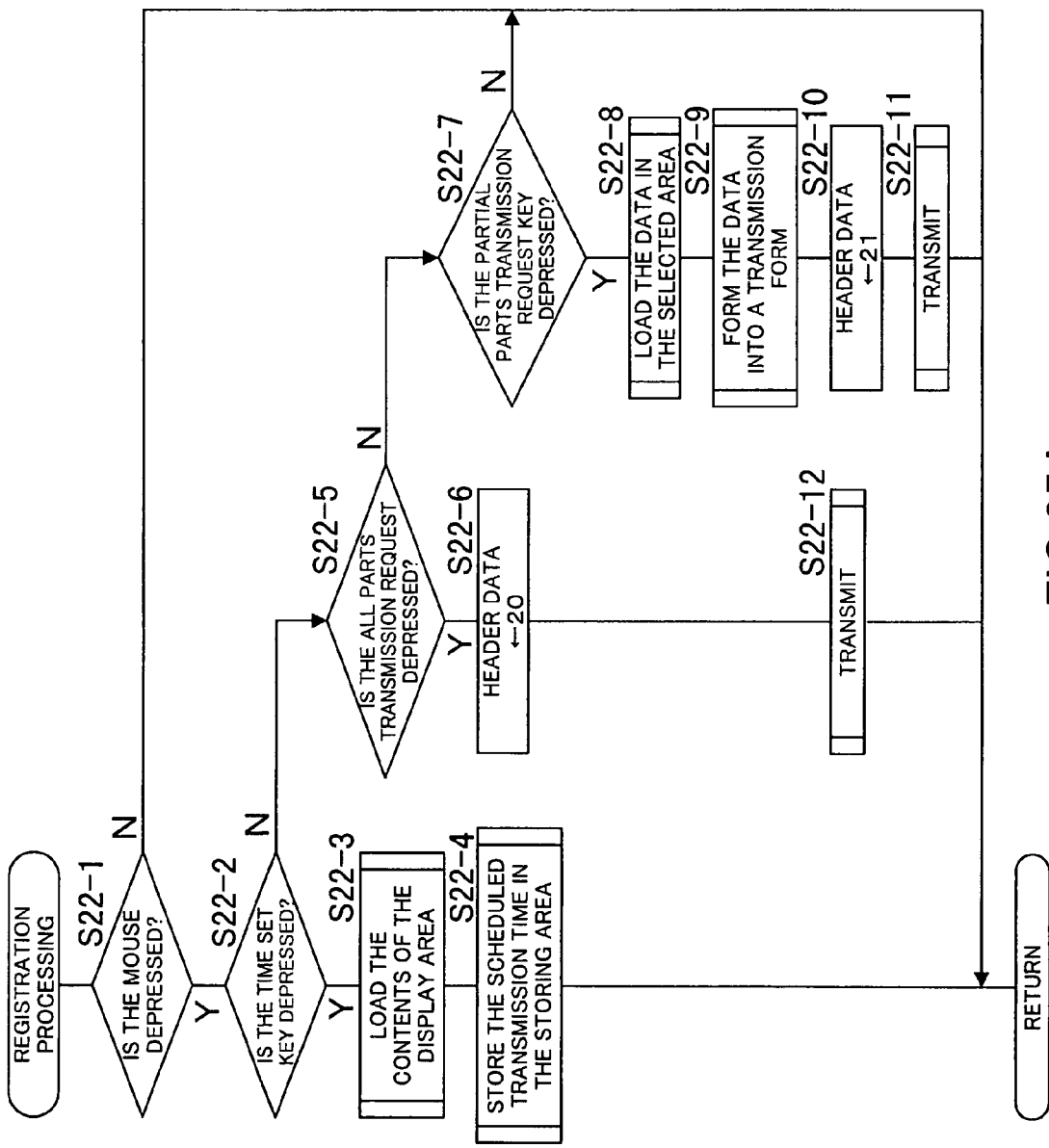
FIG.25B
FIG.25A

PARTS-MANAGEMENT SYSTEM, METHOD OF MANAGING PARTS AND PARTS-MANAGEMENT APPARATUS

This application claims priority to Japanese Patent Application Nos. H11(1999)-265231 filed on Sep. 20, 1999, the disclosure of which is incorporated by reference in its entirety.

BACKGROUND OF THE INVENTION

1. Field of the Invention

The present invention relates to a parts-management system, a method of managing parts and a parts-management system for managing parts used for an image forming apparatus such as a copying machine, a printer and a facsimile machine and other various apparatus.

2. Description of Related Art

The above-mentioned apparatus employs various parts each having different durability, and the life of these parts is managed by a controller such as a CPU mounted in the apparatus.

Conventionally, however, when a life of an apparatus as a whole terminates or a new apparatus is introduced in place of an old apparatus, the old apparatus is usually discarded as a whole even if it includes reusable parts.

On the other hand, such a reusable part is sometimes reused. However, in cases where such a part is reused in a plurality of apparatuses, it is very difficult to effectively make full use of such a part until its life terminates because no management system for continuously managing the history of such a part was available. This cannot give a complete satisfaction to a recent requirement for making full use of resources.

SUMMARY OF THE INVENTION

It is an object of the present invention to provide a parts-management system which can make full use of parts different in durability by managing each history thereof even if the parts are used in a plurality of apparatuses.

It is another object of the present invention to provide a method of managing parts which can make full use of parts as long as possible.

It is still another object of the present invention to provide a parts-management apparatus which can be preferably used in the aforementioned parts-management system and/or the aforementioned method of managing parts.

According to a first aspect of the present invention, a parts-management system comprises a terminal apparatus and a management apparatus for communicating with the terminal apparatus. The terminal apparatus includes a first memory which stores identification information of each part used in the terminal apparatus and an operation value corresponding to an operation of each part in a mutually related manner, a controller which performs a predetermined operation processing corresponding to an operation of each part and updates the operation value stored in the memory when the part operates, a first transmitter which transmits the identification information of each part and an operation value corresponding to the identification information to the management apparatus, and a second transmitter which transmits a request signal for requesting a transmission of an operation value for at least one part. The management apparatus includes a second memory which stores the identification information of each part and the operation value each sent by the first transmitter in a mutually related manner, and a third transmitter which transmits the identification information and the operation value each stored in the second memory to the terminal apparatus in response to the request signal.

With this parts-management system, since an operation value corresponding to the operation of each part can be sent and received between the terminal apparatus and the management apparatus, the operation history of each part can be continuously managed by the management apparatus even in a case where each part has been used in a plurality of apparatus. As a result, each part can be used as long as possible.

According to a second aspect of the present invention, a method of managing parts for managing parts used in a terminal apparatus while conducting a data communication between the terminal apparatus and a managing apparatus, includes the steps of transmitting identification information of each part used in the terminal apparatus and an operation value corresponding to an operation of each part in a mutually related manner from the terminal apparatus to the managing apparatus, storing the identification information of each part and the operation value in a mutually related manner in a memory of the managing apparatus, transmitting a request signal for requesting a transmission of an operation value for at least one part from the terminal apparatus to the management apparatus, and transmitting the identification information and the operation value each stored in the memory of the managing apparatus in response to the request signal from the managing apparatus to the terminal apparatus.

According to this parts-management method too, since an operation value corresponding to the operation of each part can be sent and received between the terminal apparatus and the management apparatus, the operation history of each part can be continuously managed by the management apparatus even in a case where each part has been used in a plurality of apparatus. As a result, each part can be used as long as possible.

According to a third aspect of the present invention, a parts-management apparatus which is capable of communicating with a terminal apparatus and manages parts used in the terminal apparatus, comprises a memory for storing identification information of each part used in the terminal apparatus and an accumulated data corresponding to an operation of each part in a mutually related manner, updating means for updating the accumulated data based on data sent from the terminal apparatus; and a transmitter which transmits at least one part identification information and its accumulated data each stored in the memory in response to a request signal from the terminal apparatus.

With this parts-management apparatus, since the accumulated data can be stored while updating depending on the operation of each part sent from the terminal apparatus and further can be sent to the terminal apparatus, even in a case where each part has been used in a plurality of apparatuses, the operation history of each part can be continuously managed.

Other objects and the features will be apparent from the following detailed description of the invention with reference to the attached drawings.

BRIEF DESCRIPTION OF DRAWINGS

The present invention will be more fully described and better understood from the following description, taken with the appended drawings, in which:

FIG. 7 shows a content of a RAM 47 in the copying machine;

FIG. 11 is a flowchart showing a subroutine of the communication processing between the data terminal and the copying machine 4 executed by the CPU 41 in the copying machine 4;

FIG. 13 shows the content of the RAM in the data terminal;

FIG. 14 shows a receiving buffer of the part ID sent from the copying machine;

FIG. 20 shows the content of the RAM of the computer at the center side;

FIG. 21 is an explanatory view for explaining the definition of the sending/receiving format among the center, the data terminal and the cleaning apparatus;

FIG. 24A is a main flowchart of the recycle parts registration processing;

FIG. 24B is a flowchart showing the content of the screen update processing;

FIG. 25A is a flowchart of the registration processing shown in FIG. 24A;

FIG. 25B is a flowchart showing the content of the scheduled transmission processing shown in FIG. 22;

DETAILED DESCRIPTION OF THE PREFERRED EMBODIMENTS

Figure 1:
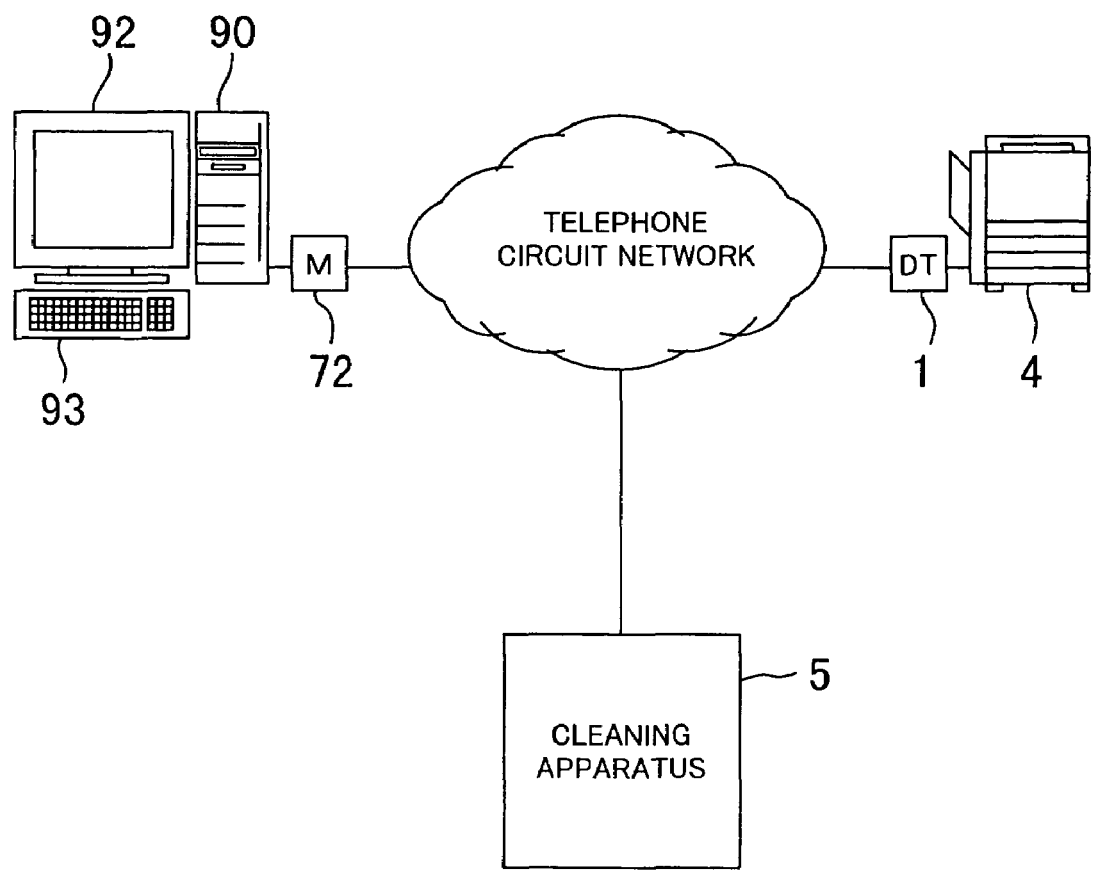
FIG. 1 shows an overall structure of the recycle system according to an embodiment of the present invention.

FIG. 1 is an overall structural view of the parts-management system according to one embodiment of the present invention.

In this parts-management system, a copying machine 4 as a terminal apparatus at a user side and a computer (management apparatus) 90 at the center (management) side are connected by a telephone circuit network. In this parts-management system, although a number of apparatuses at the user side can be connected to the computer at the center side, this embodiment shows that only one apparatus at the user side is connected to the computer at the center side for simplifying the explanation.

The copying machine 4 at the user side is connected to the telephone circuit network via a data terminal 1 with a built-in modem having a function as a communication terminal apparatus. The data terminal 1 is an apparatus which receives various information of the copying machine 4, subjects the information to a predetermined processing and then transmits the processed information to the computer 90, and further supplies the data sent from the computer 90 to the copying machine 4.

On the other hand, the computer 90 at the center side is connected to the telephone circuit network via a modem 72 having a function as a communication terminal apparatus. The computer 90 is equipped with a CPU 91 (see FIG. 3) and is connected by a display 92 and a keyboard 93. The computer 90 conducts various diagnosis about the copying machine 4 and stores the data sent from the data terminal 1 based on the data. In other words, the status of the copying machine, the cause of failure and/or the remedy method are operated, and/or the data for managing and maintaining the copying machine are stored and added up.

In FIG. 1, the reference numeral 5 denotes a cleaning apparatus for subjecting the parts of the copying machine 4 and other terminal apparatus to the prescribed washing and cleaning operations. This cleaning apparatus 5 is also connected to the aforementioned computer 90 as a managing apparatus via the telephone circuit network, and transmits a cleaning termination signal to the computer 90 after the washing and cleaning operations of the parts.

Figure 2:
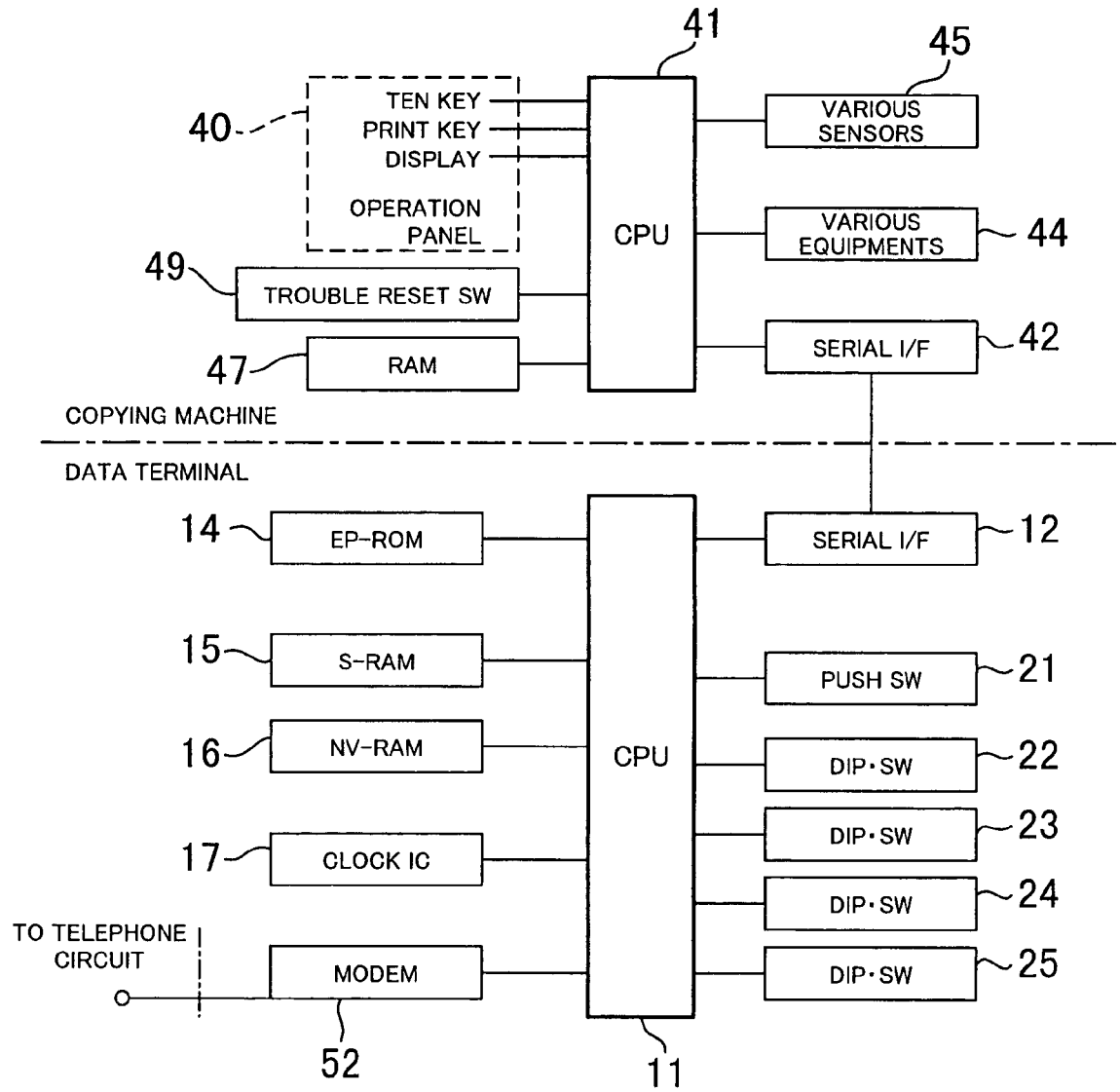
FIG. 2 is a block diagram showing the structure of the copying machine and the data terminal.

FIG. 2 is a block diagram showing the construction of the copying machine 4 and that of the data terminal 1.

The copying machine 4 is an apparatus for forming a reproduction image on a paper by scanning an original image. The copying machine 4 is equipped with a CPU 41 to which an operation panel 40 for conducting various operations such as a copying operation, a trouble reset switch 49, a RAM 47 having a battery backup system, various sensors 45, various equipments 44 such as a scanner and a printer and a serial I/F 42 are connected. The CPU 41 operates various equipments 44 to perform a copying operation by receiving an operation input from the operation panel 40, a reset input from the trouble reset switch 49 and a signal input from various sensors 45.

Furthermore, the CPU 41 transmits the counted data of the following counters to the data terminal 1 via the serial I/F 42.

As a counter which will be a base of copy charge to be calculated at the center side, there are:

a total counter showing the number of paper ejections; and a counter for each paper-size showing the number of the times the paper was used.

As a counter whose counted number will be used as a standard for maintenance, there are:

a jam counter for each portion showing the number of the times a jam occurred at the portion;

a trouble counter for each portion showing the number of the times a trouble occurred at the portion; and a PM counter whose counted number will be used as a standard for a scheduled maintenance for each part. (The PM counter is a counter which counts the number of the times the part was used, and the counted value will be used as a standard of, for example, a timing for changing the part.)

As various element data which exerts an influence on an image forming process, there are:

a time required to transport the paper;

a surface electrical potential of a photosensitive drum;

a toner density of a developer;

an exposure of a photosensitive drum;

a bias voltage for developing;

an amount of toner on a photosensitive drum; and a grid voltage of an electrification charger.

Furthermore, in addition to the aforementioned conventional transmission data, the CPU 41 transmits the following recycle data which are peculiar to the present invention:

an identification number (hereinafter referred to as "ID") as an identification mark of each part equipped in the copying machine;

integrated suction times of a solenoid (having an ID);

an integrated rotation time of various motors (each having an ID);

an integrated operation time of a print head (having an ID);

an integrated time of passing an electric current through a CPU board (having an ID);

integrated rotation numbers of a photosensitive drum (having an ID);

an integrated time of passing an electric current through a charger (having an ID);

integrated depressed times of operation panel keys (having an ID); and an integrated time of passing an electric current through an operation panel LCD (having an ID).

On the other hand, the data terminal 1 is equipped with a CPU 11. Connected to the CPU 11 are a ROM 14 storing a control program, a non-volatile memory 16 for storing data such as a telephone number of the center, a work RAM 15 having a battery backup system, a clock IC 17 having a battery backup system, a serial I/F 12, a push switch 21, four DIP switches 22-25 and a modem 52.

The data terminal 1 receives data sent from the copying machine 4 via the serial I/F 42 and the serial I/F 12, and is connected to the communication circuit to the center side by activating the modem 52 when predetermined transmission conditions are satisfied, to send data on the copying machine 4 (such as the aforementioned element data, counter data and recycle data) to the CPU 91 (see FIG. 3) of the computer 90 at the center side. When data are sent from the center side, the data will be transferred to the copying machine 4 via each I/F as in the same manner mentioned above.

The push switch 21 is a switch for commanding the execution of the initial transmission and the like. The DIP switch 22 is a switch to select the input mode of the telephone number of the center. The DIP switch 23 is a switch to select the input mode of the data terminal identification ID (DTID). The DIP switch 24 is a switch to select the input mode of the center identification ID number (center ID). The DIP switch 25 is a switch to set the initialization set mode.

Figure 3:
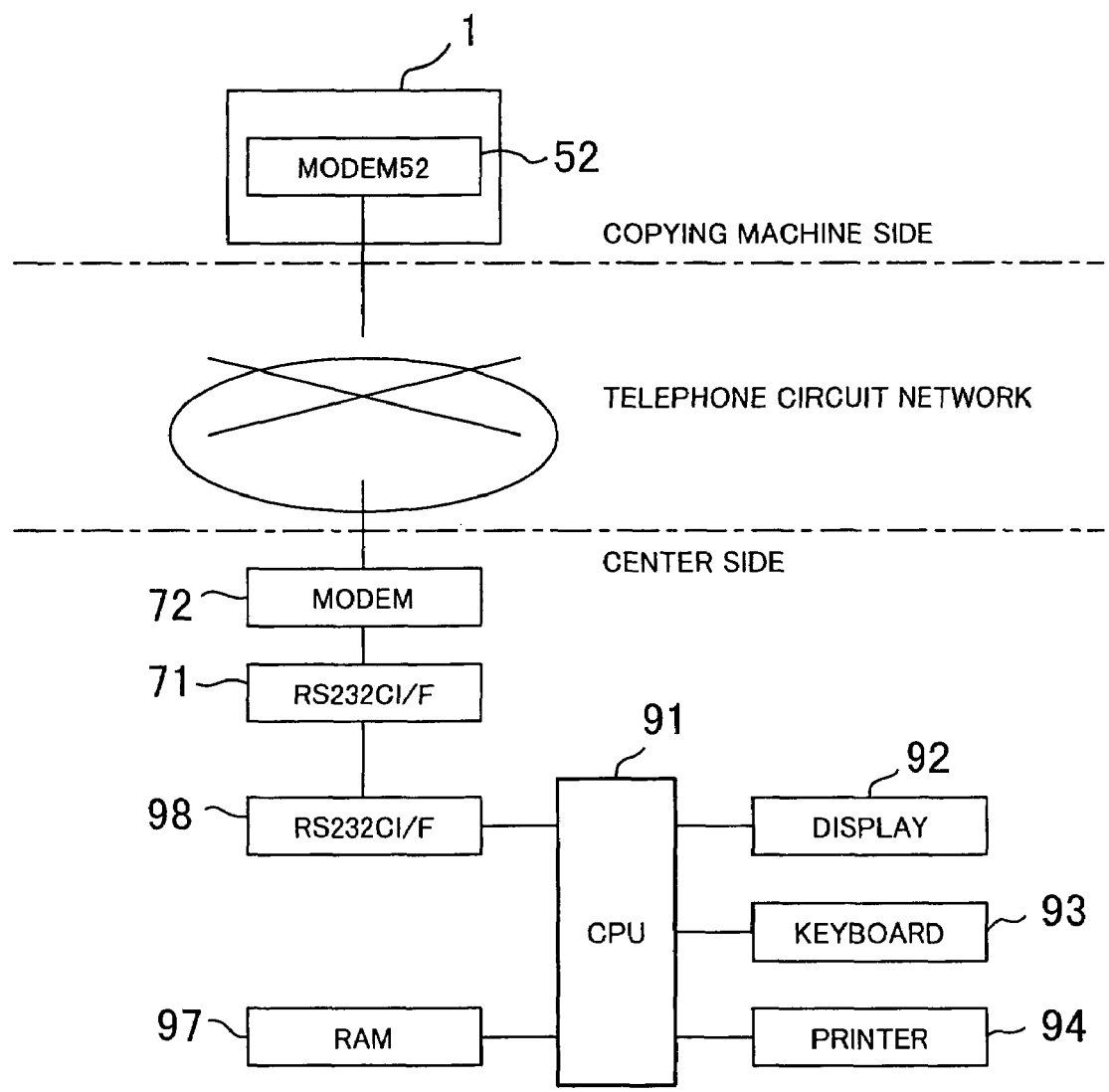
FIG. 3 is a block diagram showing the modem and the structure of the computer at the center side.

FIG. 3 is a block diagram showing the structure of the modem 72 and the computer 90 at the center side.

Connected to the CPU 91 of the computer 90 are the display 92, the keyboard 93, the printer 94, the RAM 97 having a backup battery system and the serial I/F 98. The computer 90 is connected to the mode 72 via the serial I/F 98 and the serial I/F 71 at the modem side. In the actual situation, a number of copying machines are connected to the computer 90 via the telephone circuit network.

In the computer 90, the life value of each part is previously stored. The life value means an integrated time, an integrated rotation number or the like which are counted from when the part starts to operate until when the function of the part becomes unavailable, and is generally called a life. Each part has a different type and value of the life value. A life value of each part is set for the recycle data such as the integrated suction times of a solenoid, the integrated rotation time of various motors, the integrated operation time of a print head, the integrated time of passing an electric current through a CPU board, the integrated rotation numbers of a photosensitive drum, the integrated time of passing an electric current through a charger, the integrated depressed times of operation panel keys and the integrated time of passing an electric current through an operation panel LCD. In other words, the life value means the upper limit of the recycle data. In a case where a part has a very long life, or a very long integrated time of passing an electric current through a CPU board, the value equivalent to "infinite" is allotted to the part as its life value for the sake of convenience.

Figure 4:
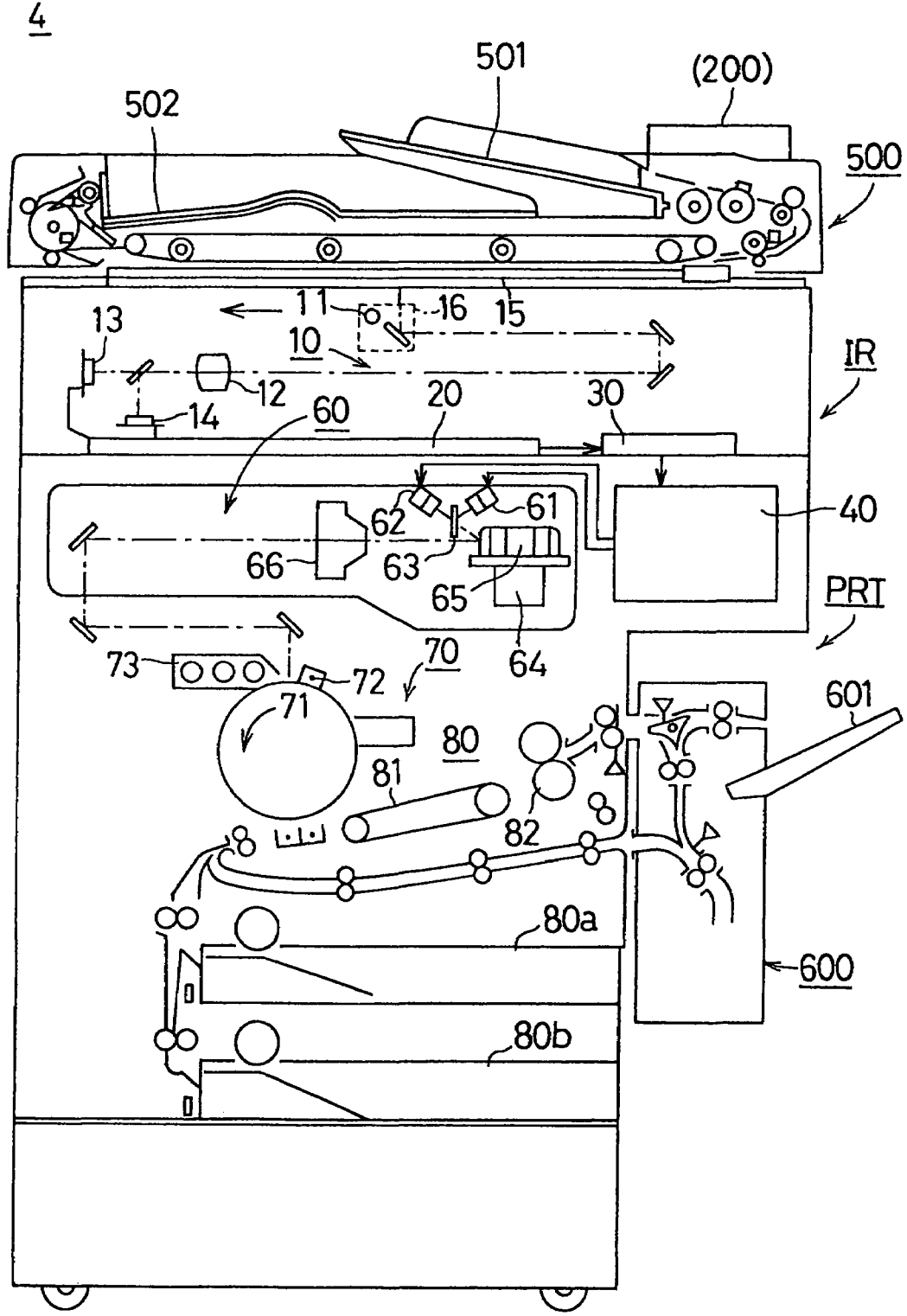
FIG. 4 is a schematic structural view of the copying machine.

FIG. 4 is a schematic structural view of the copying machine 4.

The copying machine 4 includes an image reader IR, a memory 30, a printer PRT, an operation panel 200, an original transferring portion 500 and a paper re-feeder 600. The image reader IR reads the image of the original to form an image data. The memory 30 temporarily stores the image data obtained by the image reader IR and the set image mode. The printer PRT prints on a copy paper based on the image data and the image mode each stored in the memory 30. The operation panel 200 is used to input various operations and is located at the upper portion of the copying machine 1. The original transferring portion 500 transfers the original and reverses the original when required. The paper re-feeder 600 reverses the copied paper when required to supply it to the printer PRT again. The motions of the aforementioned parts are controlled by a controller (not shown). The controller includes a ROM for storing programs to operate the copying machine 4 and a RAM for storing information required to execute the programs.

In the original transferring portion 500, the originals set on the original supplying tray 501 are automatically supplied to the reading position on the glass 15 one by one from the lowest one in response to a print command, and are ejected onto the paper eject tray 502 after the completion of image reading at the image reader IR.

The image reader IR includes a scanning system 10 and an image signal processing portion 20. At the scanning system 10, the image of the original set to the reading position is exposed by the exposure lamp 11 fixed to the scanner 16 which moves under the original. The reflected light from the original is inputted into photoelectric conversion elements 13 and 14 using a CCD array or the like via a reflection mirror and a condenser 12. Subsequently, the signals obtained in the scanning system 10 is sent to the image signal processing portion 20. In the image signal processing portion 20, the inputted signals are subjected to an image processing such as a binary processing, an image quality correction, a magnification change and an image editing.

The processed image data is stored in the memory 30.

The printer PRT includes a print processing portion 40, an optical system 60, an image forming system 70 and a paper transferring system 80. The print processing portion 40 drives the optical system 60 based on the image data and the image mode from the memory 30. In the optical system 60, the semiconductor lasers 61 and 62 emit laser beams based on the signal controlled by the print processing portion 40. The laser beams are composed by a die-clock mirror 63, reflected by the polygon mirror 65 rotated by a motor 64 and irradiated toward the photosensitive drum 71 in the image forming system 70 through a main lense 66.

In the image forming system 70, the photosensitive drum 71 is charged by the charger 72, then the drum is irradiated by the laser beam. As a result, an electrostatic latent image is formed on the photosensitive drum 71. Subsequently, a toner is formed on the electrostatic latent image by the developer 73. The toner image on the photosensitive drum 71 is transferred onto a copying paper supplied from the paper-supply cassette 80a or 80b in a paper-transferring system 80. Thereafter, the paper is transferred to a fixing device 82 by a paper-transfer belt 81 to fix the toner thereon by heat and pressure, and then discharged onto a paper-discharge tray 601 in the paper re-feeder 600.

In this copying machine 4, during the operation, errors including a paper clogging can be detected in the original transferring portion 500 and the printer PRT. Furthermore, an error such that a paper-supply cassette has run out of papers can be detected in the printer PRT, and an error such that the original is not appropriately set on the reading position can be detected in the original transferring portion 500. In addition to the above, it is possible to detect that the copying machine 4 stops due to a trouble.

Figure 5:
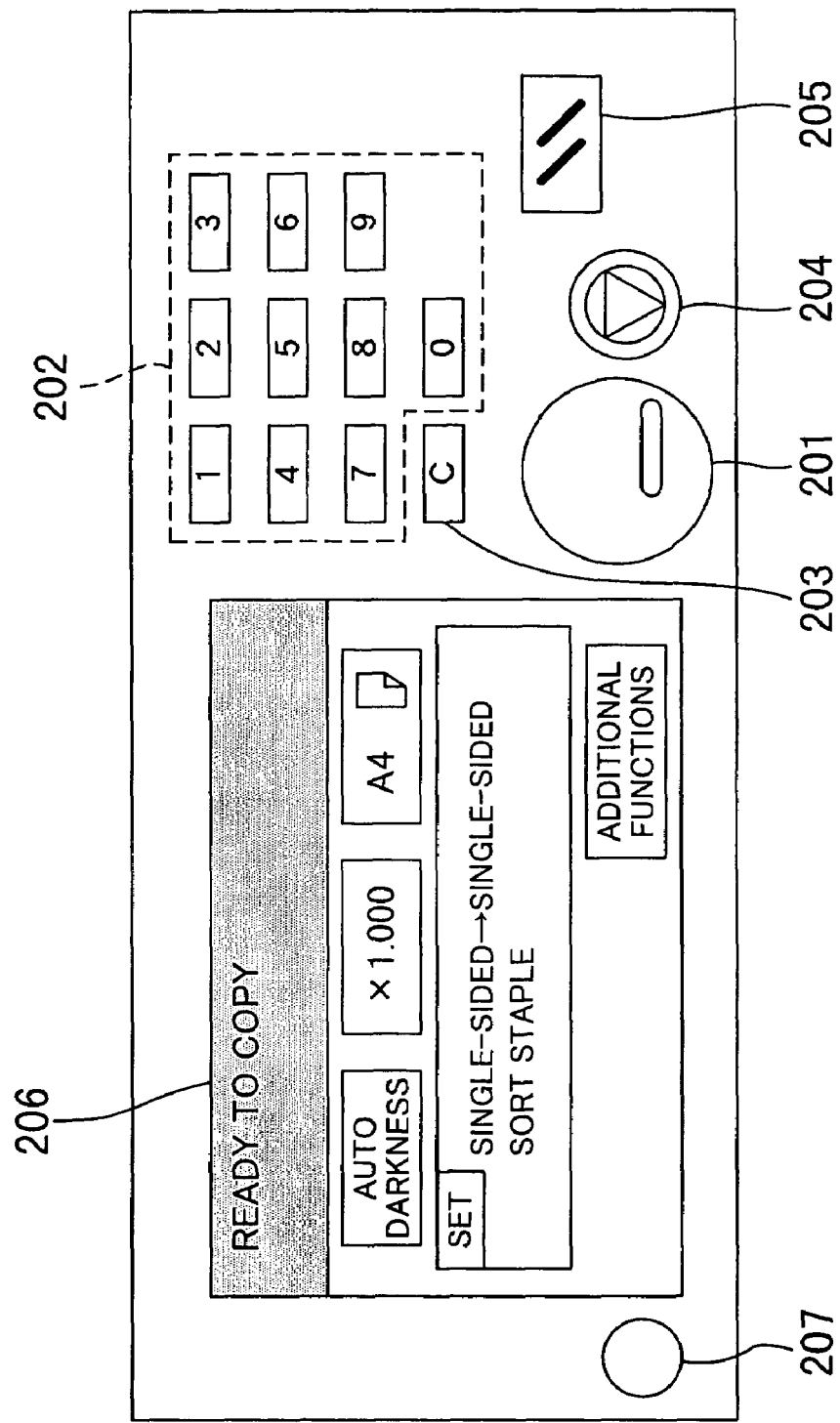
FIG. 5 is a plan view showing a structure of an operation panel of the copying machine.

FIG. 5 is a plan view showing the operation panel 200 of the copying machine 4. The print start key 201 is used to start a copying operation, and the ten key 202 is used to input a numeral such as the number to be copied. The clear key 203 is used to clear the inputted numerals or discard the image data in the memory 30. The stop key 204 is used to stop the copy operation or both the copy operation and the read operation. The panel reset key 205 is used to discard the set image mode and the job.

Furthermore, the operation panel 200 is equipped with a liquid crystal display LCD 206 having a touch panel thereon. By this touch panel, various settings corresponding to the displayed contents in the LCD 206 can be set up. For example, a magnification and other image mode can be set up. On the back side of the LCD 206, a fluorescent light (backlight) is disposed. Thus, the operation panel employs an LCD with a fluorescent light.

The reference numeral 207 denotes a recycle part search key. When the key is depressed, it is judged whether or not new parts are equipped, and the ID of the new parts is searched to be transmitted to the center.

Figure 6:
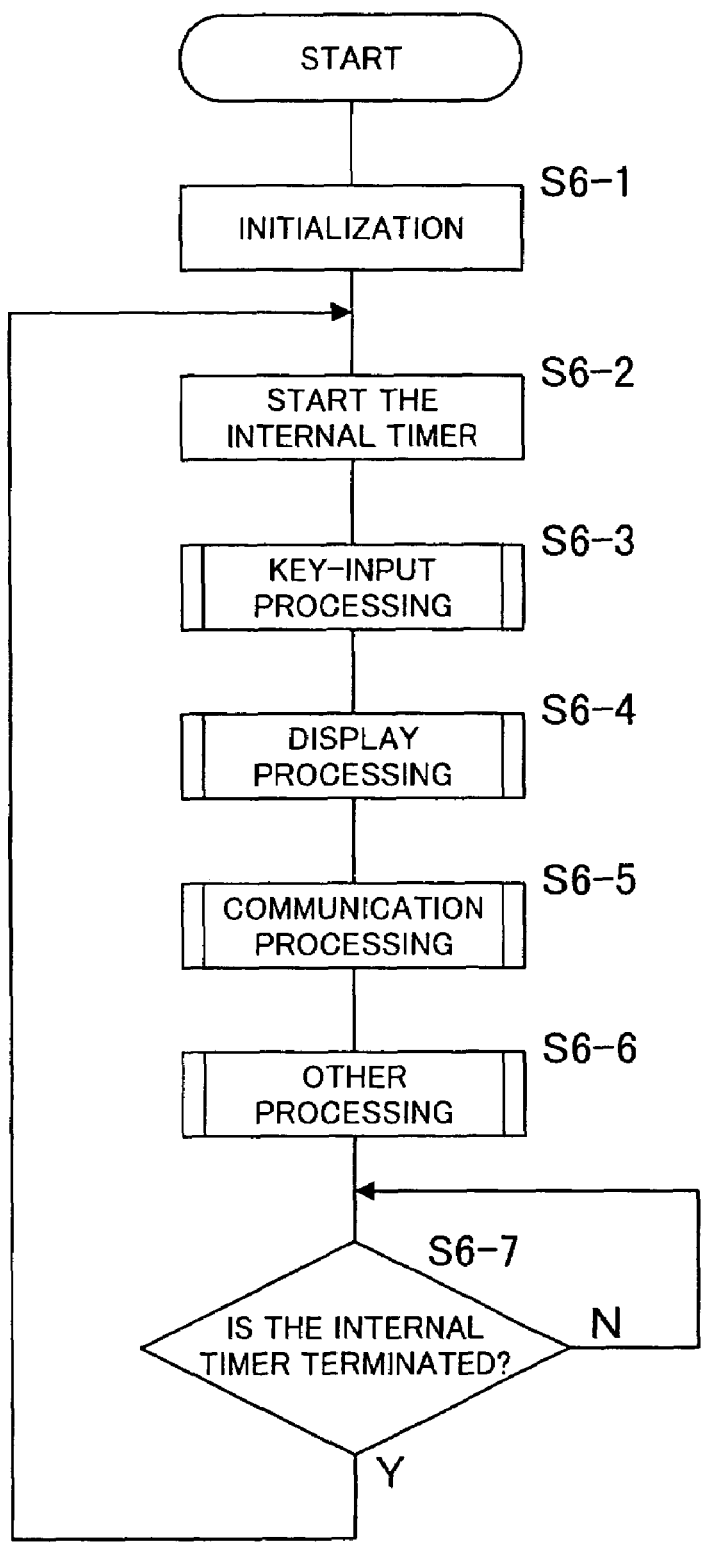
FIG. 6 is a flowchart showing a main routine executed by a CPU of the copying machine.

FIG. 6 is a flowchart of a main routine executed by the CPU 41 of the copying machine 4.

When the power of the copying machine 4 is turned on and the CPU 41 is reset, the program starts. In Step 6-1 (in the following explanation and the drawings, the word "Step" will be abbreviated as "S"), initializations of, for example, the RAM, settings of various register and settings of input/output ports are executed. In S6-2, the internal timer which is built in the CPU is activated. The value of the internal timer defines the length of one routine previously set at the initialization.

Thereafter, in S6-3, a key input processing for controlling the key inputs by the operation panel 200 shown in FIG. 5 is performed. In S6-4, a display processing for controlling the display on the LCD and LED of the copying machine 4 is performed. In S6-5, a communication processing between the copying machine 4 and the data terminal 1 is executed. These processing in S6-3 to S6-5 are performed in a subroutine.

Then, in S6-6, other processing regarding the image forming such as charging, transferring, paper supplying, transporting, developing and fixing are executed. Thereafter, in S6-7, it is judged whether or not the internal timer set in S6-2 is terminated. If it is judged that the internal timer is terminated (YES (in the drawings showing flowcharts, "Y" denotes "YES" and "N" denotes "NO") in S6-7), one routine is terminated and the routine returns to S6-2. If it is judged that the internal timer is not terminated (No in S6-7), the routine remains in S6-7.

FIG. 7 shows the contents of the RAM 47 of the copying machine 4. As shown in FIG. 7, in this RAM 47, an integrating counter and an integrating timer are stored at every part ID. For example, the value of the integrating counter of the part with the part ID "0004" is "3". The data of this RAM 47 are transmitted to and received from the data terminal 1.

Figure 8:
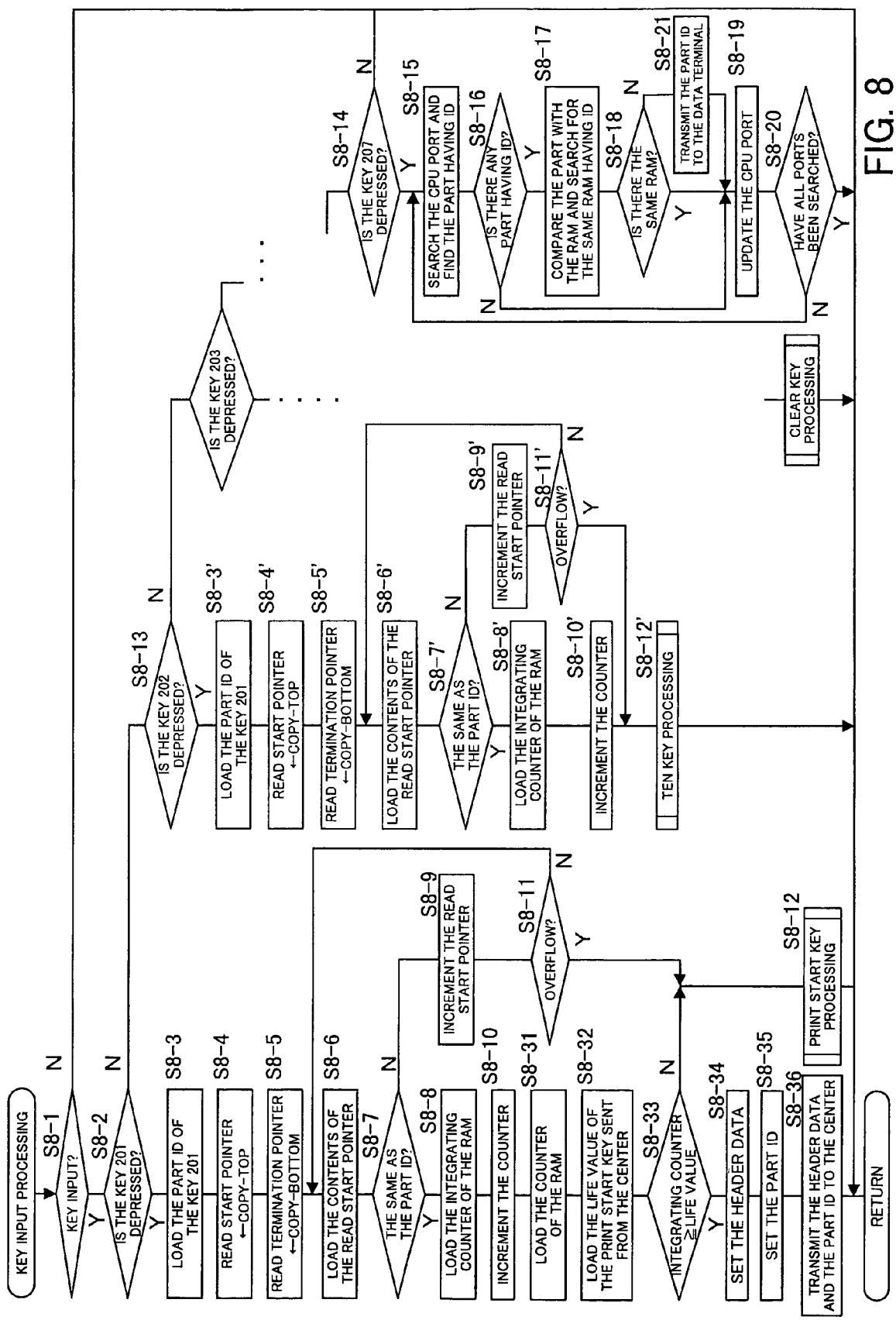
FIG. 8 is a flowchart showing the content of the "key input operation" shown in FIG. 6.

FIG. 8 is a flowchart of the "key input processing" of S6-3 shown in FIG. 6, and relates to a processing concerning the operation panel of the copying machine.

S8-1 to S8-12 and S8-31 to S8-36 relate to a processing concerning the print key 201. The functions to be attained here will be explained as follows. If a part ID corresponding to the print key exists when the print key 201 is depressed, the counter showing the depressed number of the key is incremented. Thereafter, the data will be transmitted to the computer 90 at the center side via the data terminal 1 later. If there is no part ID, since the print key 201 is not a part to be recycled, the counter showing the number of the depressed times is not incremented. And the print key processing is executed. After the incrementation, the number of the times the print key 201 was depressed is compared with the life value, and the use of the print key is prohibited when the number is equal to or larger than the life value. Then, the prohibition notice will be given to the computer 90 at the center side.

First, in S8-1, it is judged whether or not there is a key input. If there is a key input (YES in S8-1), in S8-2, it is judged whether or not the print start key 201 is depressed. When the key 201 is depressed (YES in S8-2), in S8-3, the part ID of the print start key 201 is loaded.

Next, in S8-4, the top address in the RAM 47 shown in FIG. 7 is set to the read start pointer. In S8-5, the bottom address of the RAM 47 shown in FIG. 7 is set to the read termination pointer. Then, in S8-6, the contents (part ID) of the read start pointer address is loaded. Thereafter, in S8-7, it is judged whether or not the part ID coincides with the part ID loaded in S8-3.

If the part ID coincides with the part ID loaded in S8-3 (YES in S8-7), in S8-8, the integrating counter of the RAM 47 is loaded. Thereafter, in S8-10, the integrating counter is incremented. Next, in S8-31, the integrating counter of the RAM 47 is loaded again. Thereafter, in S8-32, the life value of the print start key 201 sent from the center is loaded. In S8-33, the value of the integrating counter is compared with the life value.

If the life value is larger than the value of the integrating counter (NO in S8-33), since the life is not terminated, the routine proceeds to S8-12 to start the print start key processing such as a start of a paper-supply operation and an execution of an electrophotograph process. Then, the routine returns. Since the details of the print start key processing does not relate to the present invention, the explanation will be omitted.

On the other hand, as a result of the comparison in S8-33, if the value of the integrating counter is larger than or equal to the life value (YES in S8-33), since it is believed that the life is terminated, in S8-34 and S8-35, the header data and the part ID shown in the format (1)-(1-3) shown in FIG. 21 at the time of the prohibition notice, which will be explained later, are set. In S8-36, the header data and the part ID are transmitted to the center. Then, the routine returns. In other words, in this case, the print start key processing in S8-12 is not executed, and the use thereof is prohibited.

As a result of the judgement in S8-7, if the ID does not coincide with the loaded part ID (NO in S8-7), after the read start pointer is incremented in S8-9, in S8-11, it is judged whether or not the read start pointer exceeds the read termination pointer. If it does not exceed (NO in S8-11), the routine returns to S8-6 to load the contents (part ID) of the subsequent address. If the read start pointer exceeds the read termination pointer (YES in S8-11), since there is no ID which coincides with the loaded part ID in the RAM 47, it is judged that there is no counter to be incremented, and the print start key processing in S8-12 starts. Then, the routine returns.

As mentioned above, when an identification number of at least one part is read out and a part given an identification number operates, a prescribed operation processing is executed depending on the operation, and the operation result is stored in a predetermined data area. Furthermore, when the life of the part terminates, the use of the part is prohibited and the prohibition notice is given to the center side.

In S8-2, if it is judged that the print key 201 is not depressed (NO in S8-2), it is judged whether or not the ten key 202 is depressed. If depressed (YES in S8-13), the processing in S8-3' to S8-11' regarding the ten key 202, which are similar to the aforementioned processing in S8-3 to S8-11, are executed, and further the ten key processing is executed in S8-12'. If it is judged in S8-13 that the ten key 202 is not depressed, the clear key 203, the stop key 204 and the panel reset key 205 will be checked in turn whether or not it is depressed. With regard to these keys, the processing similar to the aforementioned processing in S8-3 to S8-12 will be executed. In FIG. 8, however, these processing are omitted. If none of the key was depressed, in S18-14, it is judged whether or not the recycle parts search key 207 is depressed.

S8-14 to S8-21 show processing regarding the recycle parts search key 207 mentioned in the explanation of FIG. 5. The functions to be attained here will be explained as follows.

When the key 207 is depressed, all of the CPU ports are searched to find all parts each having a part ID. In a case where there is a part to which a part ID is given, it is judged whether or not the part ID is defined by the RAM shown in FIG. 7.

A part ID not defined by the RAM will be sent to the center via the data terminal 1 later. This will be used when the data of the part ID stored in the center is requested in a case where some recycle parts are exchanged after the copying machine is delivered to the user. By this processing, even if the part has been used in a plurality of systems, the part life data such as the counter value can be continuously obtained.

Concretely, in S8-15, the ports of the CPU 41 are searched to find the parts each having an ID. In S8-16, it is judged whether or not there is a part having an ID. If there is a part having an ID (YES in S8-16), the part ID is compared with the RAM shown in FIG. 7 to find that there is the same RAM having the ID. In S8-18, judgment is performed. If YES in S8-18, in S8-19, a CPU port to be searched is updated. Next, S8-20, it is checked whether or not all of the ports have been searched. If all of the ports have not been checked (NO in S8-20), the routine returns to S8-15 to complete the checks. If completely checked (YES in S8-20), the routine returns.

At the judgment in S8-18, in a case where there is no same RAM (NO in S8-18), in S8-21, the part ID is transmitted to the data terminal 1 and the routine proceeds to S8-19.

At the judgment in S8-14, in a case where the key 207 is not depressed (NO in S8-14), the routine returns.

Figure 9:
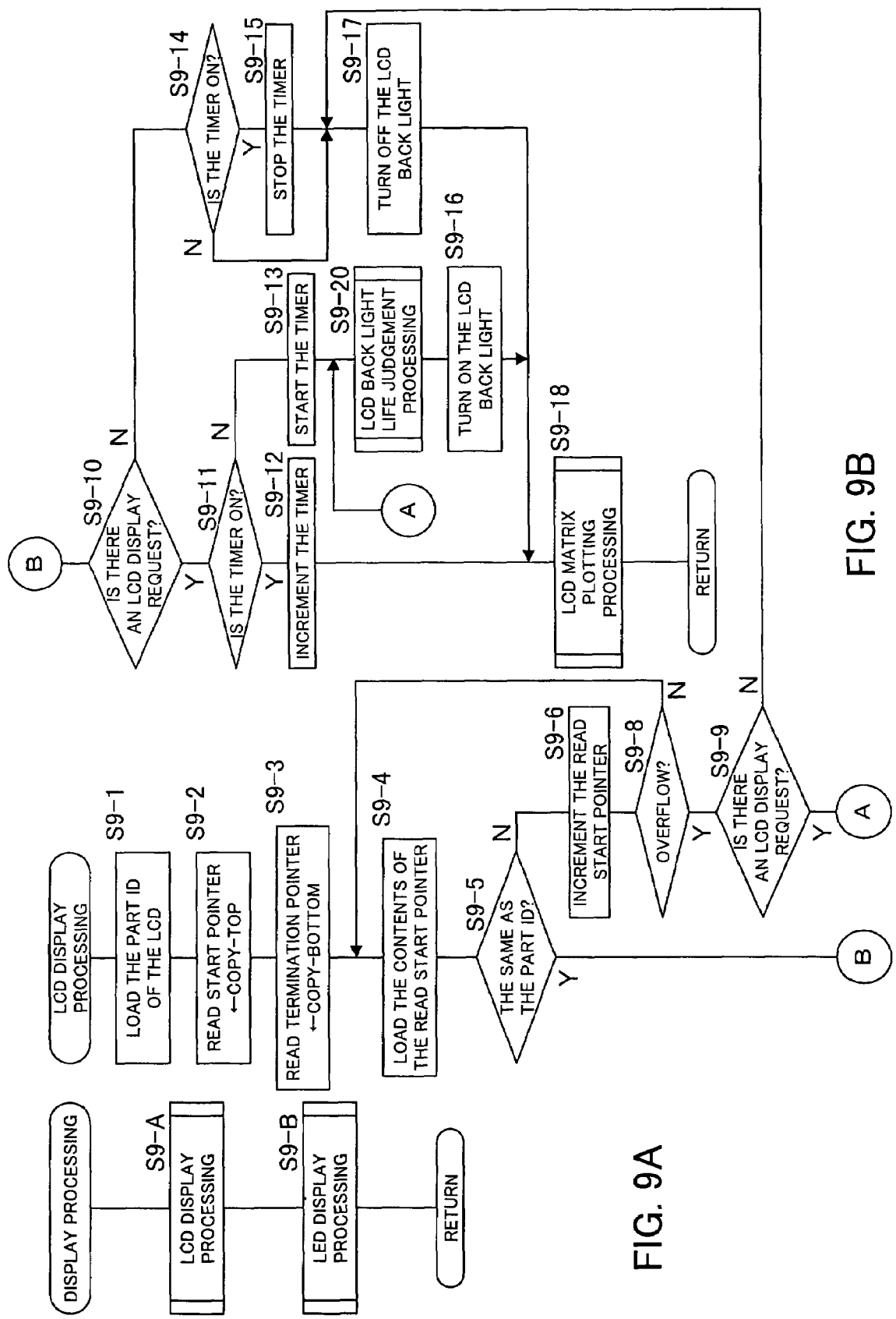
FIG. 9 is a flowchart showing the content of the "display processing" shown in FIG. 6.

FIG. 9 is a flowchart of the "display processing" shown in S6-4 in FIG. 6. FIG. 9A shows the structure of the display processing which executes a display processing (LCD display processing) S9-A concerning the liquid crystal display (206 in FIG. 5) and a display processing S9-B concerning the LED. FIG. 9B is a flowchart concerning the LCD display processing S9-A in FIG. 9A.

In this embodiment, as mentioned above, a fluorescent light (backlight) is disposed on the reverse side of the liquid crystal display 206. The recycle control concerning the fluorescent light will be explained.

In S9-1, the part ID of the liquid crystal display 206 is loaded.

Next, in S9-2, the top address of the RAM 47 in FIG. 7 is set to the read start pointer, and in S9-3, the bottom address of the RAM 47 in FIG. 7 is set to the read termination pointer. Then, after the contents (part ID) of the address of the read start pointer is loaded in S9-4, in S9-5, it is judged whether or not the part ID coincides with the part ID loaded in S9-1. Thus, the part ID of the liquid crystal display 206 is searched from the RAM 47 in FIG. 7.

If the part ID coincides with the loaded part ID (YES in S9-5), in S9-10, it is judged whether or not there is an LCD display request. Concretely, the CPU 41 sets the LCD display request when the power of the copying machine 4 is turned on.

If the part ID does not coincide with the loaded part ID (NO in S9-5), after the read start pointer is incremented in S9-6, in S9-8, it is judged whether or not the read start pointer exceeds the read termination pointer. If the read start pointer does not exceed the read termination pointer (NO in S9-8), the routine returns to S9-4, then the contents (part ID) of the subsequent address is loaded. On the other hand, if the read start pointer exceeds the read termination pointer, in other words, if the part ID is not found (YES in S9-8), in S9-9, it is judged whether or not there is an LCD display request.

As a result of the judgment of the LCD display request in S90-10, if it is judged that there is a display request (YES in S9-10), since the backlight is turned on and the integrating counter is counting the turn-on time, in S9-11, it is judged whether or not the timer is in operation.

If the timer is in operation (YES in S9-11), in S9-12, the timer is incremented and the recycle data is updated. Then, the routine proceeds to the LCD matrix plotting processing in S9-18. If the timer is not in operation (NO in S9-11), since there is a display request but the timer is not in operation and light is being changed to the turn-on state from the turn-off state, in S0=−13, the timer is started. Thereafter, in S9-20, the LCD backlight life judgment processing is executed. Then, the backlight (fluorescent light) is turned on, and the routine proceeds to the S9-18 processing.

Even if the part ID is found, it is checked whether or not the timer is in operation in S9-14 even in a case where there is no LCD display request (NO in S9-10). If the timer is in operation (YES in S9-14), since the power of the copying machine 4 is being turned off, the timer which is in operation is stopped in S9-15. In S9-17, the LCD backlight is turned off. Thereafter, the routine proceeds to the processing in S9-18. If the timer is not in operation in S9-14 (NO in S9-14), the routine proceeds to S9-17.

On the other hand, if no part ID is found and there is an LCD display request as a result of the judgment in S9-9 (YES in S9-9), the routine proceeds to S9-20 to execute the backlight life judgment processing. After the backlight is turned on in S9-16, the routine proceeds to the processing S9-18. Furthermore, if there is no LCD display request (NO in S9-9), the routine proceeds to the processing of S9-17 to turn off the backlight, and then proceeds to the processing of S9-18.

As mentioned above, in a case where the part ID of the liquid crystal display 206 is found, the recycle data are updated, the life judgment processing is carried out, and the backlight is turned on/off. In a case where the part ID is not found, the recycle data are not updated and only the turning on/off operation of the backlight is performed.

Although the LCD matrix plotting processing in S9-18 is a processing for performing a predetermined and appropriate display on the LCD matrix, the explanation will be omitted since it is not directly concerned with the present invention. The routine returns after the S9-18 processing.

Figure 10:
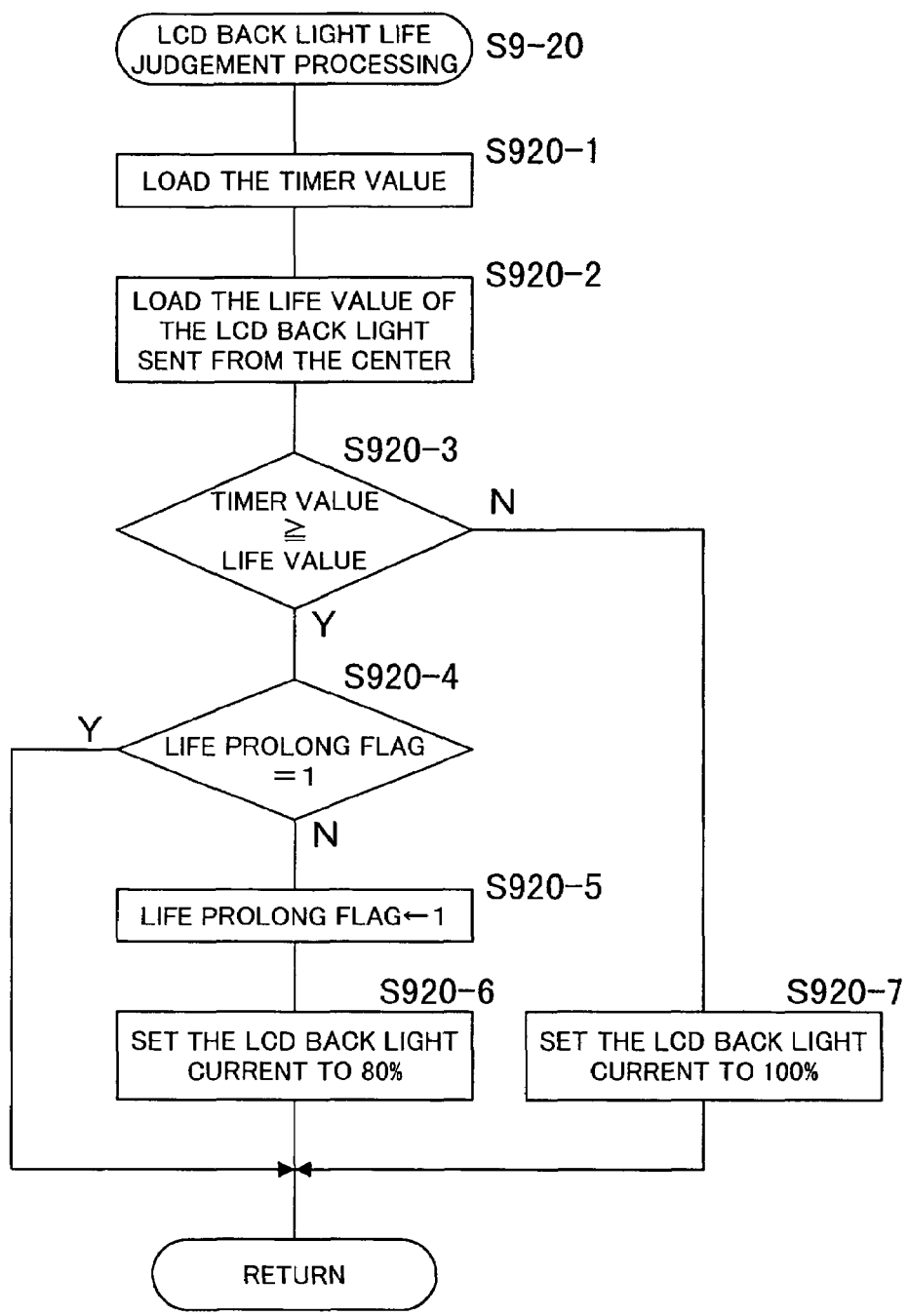
FIG. 10 is a flowchart showing a subroutine of the life judgement processing of the backlight at S9-20 in FIG. 9

FIG. 10 is a flowchart showing the subroutine of the backlight life judgement processing of S9-20 in FIG. 9.

In this processing, first, in S920-1, the timer value or the integrated turn-on time of the LCD backlight is loaded.

Next, in S920-2, the "LCD backlight life value" sent from the center in the life value transmission format (2) (2-4) shown in FIG. 21, is loaded.

Then, in S920-3, the loaded timer value is compared with the life value. As s result, if the life value is larger than the loaded time value (NO in S920-3), since the life is not terminated, the routine proceeds to S920-7 to set the backlight current to 100% and passing electric current through the backlight. Then, the routine returns.

On the other hand, if the timer value is larger than or equal to the life value (YES in S920-3), since the life is already terminated, the parameter is changed in order to prolong the life. However, before changing the parameter, in S920-4, it is checked whether or not the parameter has been already changed in the past, i.e., the life prolong flag is 1. If the life prolong flag is 1 (YES in S920-4), it means that the parameter has been changed in the past. Therefore, the routine returns without changing the parameter.

If the life prolong flag is not 1 (NO in S920-4), it means that the parameter has not been changed in the past. Therefore, in S920-5, the life prolong flag is set to 1 so as not to change the parameter subsequently. Then, in S920-6, the parameter is changed. Here, the backlight current is set to 80% of the present current. The brightness of the LCD backlight changes depending on the current passing through the LCD backlight. If the current increases, the brightness increases, and if the current decreases, the brightness decreases. However, the larger current shortens the life, and the smaller current prolongs the life. Accordingly, the life is prolonged by decreasing the current passing through the backlight.

In general, the current passing through the backlight is set to the standard, "not too bright, not too dark," and the life value is set based on the standard. As in this embodiment, even if the integrated current pass time is reached to the life value, the function is satisfied even though the brightness becomes dark a little by setting the passing current to be 80%, which results in a longer life.

As mentioned above, in this embodiment, with regard to the parts such as the backlight which can be changed its parameter, the parameter is changed when its life is terminated. With regard to the parts such as the print start key 201 mentioned above, which cannot be changed its parameter, its use is prohibited.

The explanation concerning the copying machine 4 has been made above. In this embodiment, in order to simplify the explanation, the number of the depressed times of the key on the operation panel and the current pass time of the LCD have been explained as one of the recycle data. However, it is needless to say that the followings will also be applicable as the recycle data: an integrated rotation time of various motors such as a polygon motor; a turn-on time of a laser diode; an integrated suction times of a solenoid; an integrated operation time of a print head; an integrated operation time of a CPU board; an integrated rotation numbers of a photosensitive drum; and integrated turn-on time of a charger; an integrated depressed times of operation panel keys other than the print start key 201; and the like.

FIG. 11 is a flowchart showing the subroutine of the communication processing which is executed by the CPU 41 of the copying machine 4 in S6-5 shown in FIG. 6 between the CPU 41 and the data terminal 1.

As shown in FIG. 11A, this processing includes the transmission processing in S71 and the receiving processing in S72. The receiving processing in S72 includes a RAM updating processing in S721 which updates the contents of the RAM 47 and other processing in S722 as shown in FIG. 11B.

The contents of the RAM updating processing in S721 is shown in FIG. 11C. In this processing, first, in S721-1, the part ID transmitted from the data terminal 1 is loaded. Thereafter, in S721-2, it is checked whether or not there is a part in the copying machine 4 which coincides with the transmitted part ID.

If there is not part (NO in S721-2), the routine proceeds to S721-13 to execute other processing and then returns. If there is a part (YES in S721-2), in S721-3, the top address of the RAM 47 shown in FIG. 7 is set to the read start pointer, and the bottom address is set to the read termination pointer in S721-4. Then, in S721-5, the contents of the read start pointer address (part ID) is loaded. Thereafter, in S721-6, it is judged whether or not the read out ID is invalid (FFFF).

If invalid (YES in S721-6), in S721-7, the part ID sent from the data terminal 1 is written in the part ID area of the RAM 47. This is the case that a new part is employed, and the data will be written in an empty address. Then, the routine proceeds to S721-11.

If not invalid (NO in S721-6), in S721-8, it is judged whether or not the part ID coincides with the part ID transmitted from the data terminal 1. If it coincides (YES in S721-8), the routine proceeds to the S721-11. If it does not coincide (NO in S721-8), in S721-9, the read start pointer is incremented for reading the subsequent part ID. Then, in S721-10, it is judged whether or not the read start pointer exceeds the read termination pointer (whether or not the read start pointer overflowed).

If overflowed (YES in S721-10), there is no area to be written, so other processing in S721-13 is executed, and the routine returns. If not overflowed (NO in S721-10), the routine returns to S721-5 to load the contents (part ID) of the subsequent address. Then, the steps of S721-6, S721-8, S721-9 and S721-10 will be repeated until it is judged to be invalid in S721-6 or the part ID coincides with the part ID transmitted from the data terminal 1.

In S721-11, the counter value transmitted from the data terminal 1 is written into the integrating counter area of the RAM 47 of the copying machine 4 shown by the read start pointer. Then, also in S721-12, the timer value transmitted from the data terminal 1 is written into the integrating timer area of the RAM 47 of the copying machine 4 shown by the read start pointer and updated. These processing means to overwrite the contents of the RAM 47 in a case where the part ID coincides with the part ID from the data terminal 1 in S721-8.

Thereafter, in S721-13, other processing is executed, and then this routine returns. In this other processing, a warning processing at the time of the overflow in S721-10 is executed, and a warning processing ins S721-2 is executed in a case where there is no part which coincides with the part ID transmitted in the copying machine 4 and the like.

As mentioned above, the data transmitted from the data terminal 1 is loaded into the copying machine 4, and an operation processing against the data is continuously executed.

Figure 12:
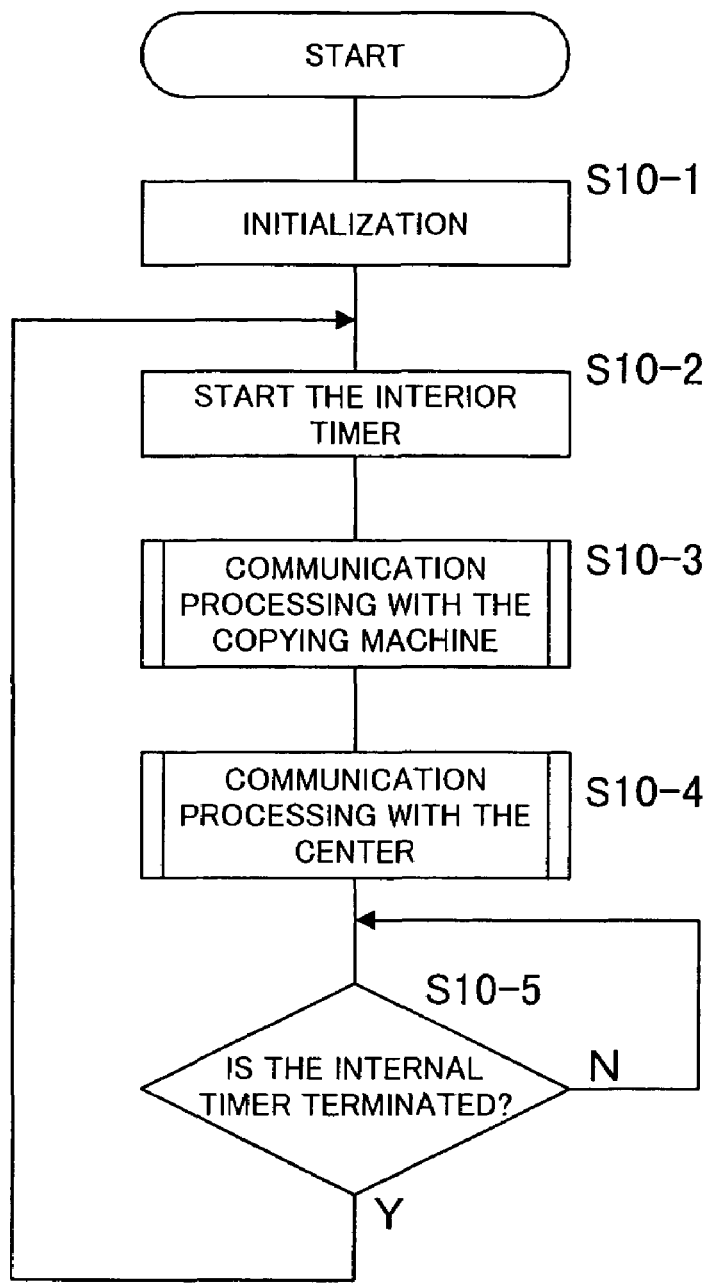
FIG. 12 is a flowchart of a main routine executed by the CPU of the data terminal.

FIG. 12 is a flowchart of the main routine executed by the CPU 11 of the data terminal 1 shown in FIGS. 1 and 2.

When the power of the data terminal 1 is turned on and the CPU 11 is reset, the program starts. First, in S10-1, initializations such as a clear of the RAM, setting of various registers and settings of input/output ports are carried out. In S10-2, the internal timer, which is built in the CPU 11 and defines one routine length previously set at the initial setting, starts.

Subsequently, in S10-3, a data communication with the copying machine 4 is carried out. Then, in S10-4, a communication processing with the center is performed. In the communication processing with the center, a data communication between the copying machine and the computer of the center side is performed via the telephone circuit network.

Then, in S10-5, it is judged whether or not the internal timer set in S10-2 is terminated. If it is judged that the internal timer is terminated (YES in S10-5), one routine terminates, and the routine returns to S10-2. If it is judged that the internal timer is not terminated (NO in S10-5), the routine stays in S10-5.

FIG. 13 shows the contents of the RAM 15 of the data terminal 1. As shown in FIG. 13, the received data from the copying machine (the integrating counter and the integrating timer) and the received data from the center (the receiving counter and the receiving timer) are stored in respective part ID. For example, the value 0102 of the part ID corresponds to the value 00000200 of the receiving counter from the center. The contents of the RAM are data-communicated between the copying machine 4 and the computer 90 at the center side in the "communication with the copying machine (S10-3)" and the "communication with the center (S10-4)" each shown in FIG. 12.

FIG. 14 shows a receiving buffer for the part ID transmitted from the copying machine 4. In FIG. 14, the part IDs 0004 and 0011 are stored, which means the status that the process shown in FIG. 8 starts by depressing the key 207 shown in FIG. 5 and the parts with IDs 0004 and 0011 are newly installed in the copying machine 4.

Figures 15A, 15B, 15C:
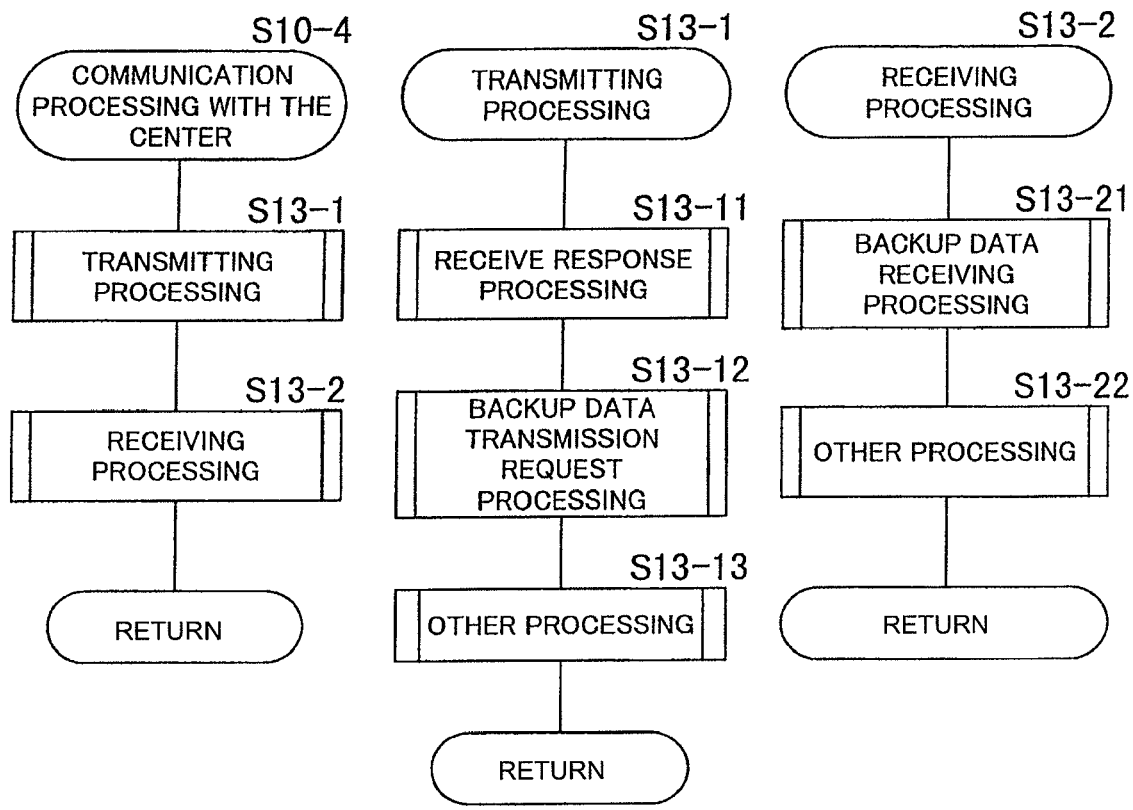
FIG. 15A is a flowchart of the communication processing with the center shown in FIG. 12.
FIG. 15B is a flowchart of the transmission processing in FIG. 15A.
FIG. 15C is a flowchart of the receiving processing in FIG. 15A.

FIG. 15A shows a flowchart of the communication processing with the center shown in S10-4 of FIG. 12. The processing includes the transmitting processing S13-1 and the receiving processing S13-2.

FIG. 15B is a flowchart of the transmitting processing in S13-1. The processing includes the receive response processing S13-11, the backup data transmission request processing S13-12 and other processing S13-13. The receive response processing S13-11 and the backup data transmission request processing S13-12 will be detailed with reference to FIG. 16 and FIG. 17, respectively.

FIG. 15C is a flowchart of the receiving processing S13-2 including the backup data receiving processing S13-21 and other processing S13-22. The backup data receiving processing S13-21 is a processing for introducing the contents of the backup data transmitted from the center side into the area of the "received data from the center" shown in FIG. 13 when the backup data is transmitted from the center side. Although the detail explanation will be omitted, the processing starts by receiving the header data "22" from the center which will be detailed later.

Figure 16:
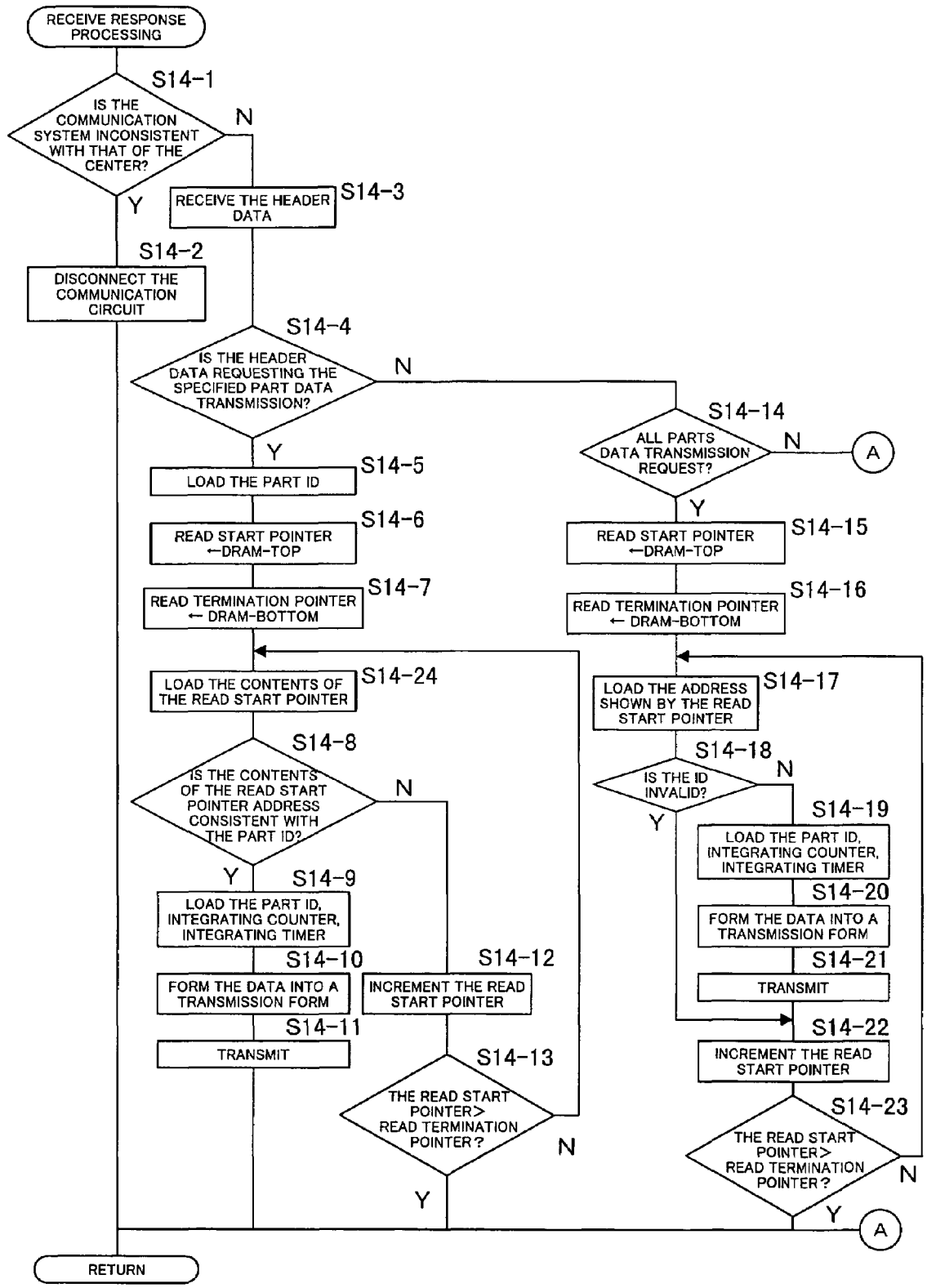
FIG. 16 is a flowchart showing the receive response processing in FIG. 15B.

FIG. 16 is a flowchart showing the detail of the receive response processing S13-11. This receive response processing is a processing for transmitting the part data of the copying machine 4 stored in the RAM when the data is requested by the center.

First, in S14-1, it is judged whether or not the communication system is inconsistent with the center. If inconsistent (YES in S14-1), in S14-2, the communication circuit is disconnected. Then, the routine returns. If consistent (NO in S14-1), in S14-3, the below mentioned header data is received. Thereafter, in S14-4, it is judged whether or not the header data is requesting the specific part data transmission.

If it is requesting the specific part data transmission (YES in S14-4), in S14-5, the part ID is loaded. Furthermore, in S14-6, the top address (Dram-top) of the RAM shown in FIG. 13 is set as a read start pointer. In S14-7, the bottom address (Dram-bottom) of the RAM shown in FIG. 13 is set as a read termination pointer. Then, in S14-24, the contents of the address shown by the read start pointer is loaded.

In S14-8, it is judged whether or not the loaded part ID is the same part ID as requested in S14-5. If the content of the read start pointer address is consistent with the part ID (YES in S14-8), in S14-9, the data received from the copying machine 4 such as the part ID, the integrating counter and the integrating timer are loaded. Then, in S14-10, the read data is formed into a transmission form. Then, in S14-11, the data is transmitted to the center, and the routine returns.

As a result of the judgment in S14-8, if the part ID is not inconsistent (NO in S14-8), if the part ID is not inconsistent (NO in S14-8), in S14-12, the read start pointer is incremented in order to load the subsequent part ID. Then, it is judged whether or not the read start pointer exceeds the read termination pointer in S14-13. If it does not exceed (NO in S14-13), the routine returns to S14-24 to load the contents of the subsequent address (part ID). If the read start pointer exceeds the read termination pointer (YES in S14-13), it means that there is no consistent part ID in the RAM. Accordingly, it is judged that there is no counter to be incremented. Then, the routine returns. Thus, the data (part ID) is searched from the RAM.

As a result of the judgment in S14-4, if it is judged that the header data is not requesting the specific part data transmission (NO in S14-4), in S14-14, it is judged whether or not the header data is requesting all parts data transmission. If it is not requesting all parts data transmission (NO in S14-14), the routine returns.

In other words, in the aforementioned processing, only the data concerning the part corresponding to the part ID specified by the center among the data in the RAM of the data terminal will be transmitted to the center.

In S14-14, if it is judged that it is requesting all parts data transmission (YES in S14-14), in S14-15, the top address (Dram-top) of the RAM shown in FIG. 13 is set as a read start pointer. Then, in S14-16, the bottom address (Dram-bottom) of the RAM shown in FIG. 13 is set as a read termination pointer. In S14-17, the contents of the address shown by the read start pointer is loaded.

In S14-18, it is judged whether or not the read out part ID is invalid (FFFF). If invalid (YES in S14-18), the routine proceeds to S14-22. If not invalid (i.e., valid) (NO in S14-18), in S14-19, the data received from the copying machine 4 such as the part ID, the integrating counter and the integrating timer are loaded. In S14-20, the read out data is formed into a transmission form to be transmitted to the center in S14-21.

In S14-22, the read start pointer is incremented in order to load the subsequent part ID. Then, in S14-23, it is judged whether or not the read start pointer exceeds the read termination pointer. If it does not exceed (NO in S14-23), the routine returns to S14-17 to load the content (part ID) of the subsequent address and transmit it to the center side. By repeating this processing, all of the parts data are transmitted to the center side.

If the read start pointer exceeds the read termination pointer (YES in S14-23), since it means that there is no parts data to be transmitted, the routine returns.

As mentioned above, when the "data transmission request signal" is received from the center side, the identification number of each part and the data stored in the data area are transmitted in a mutually related manner.

Figure 17:
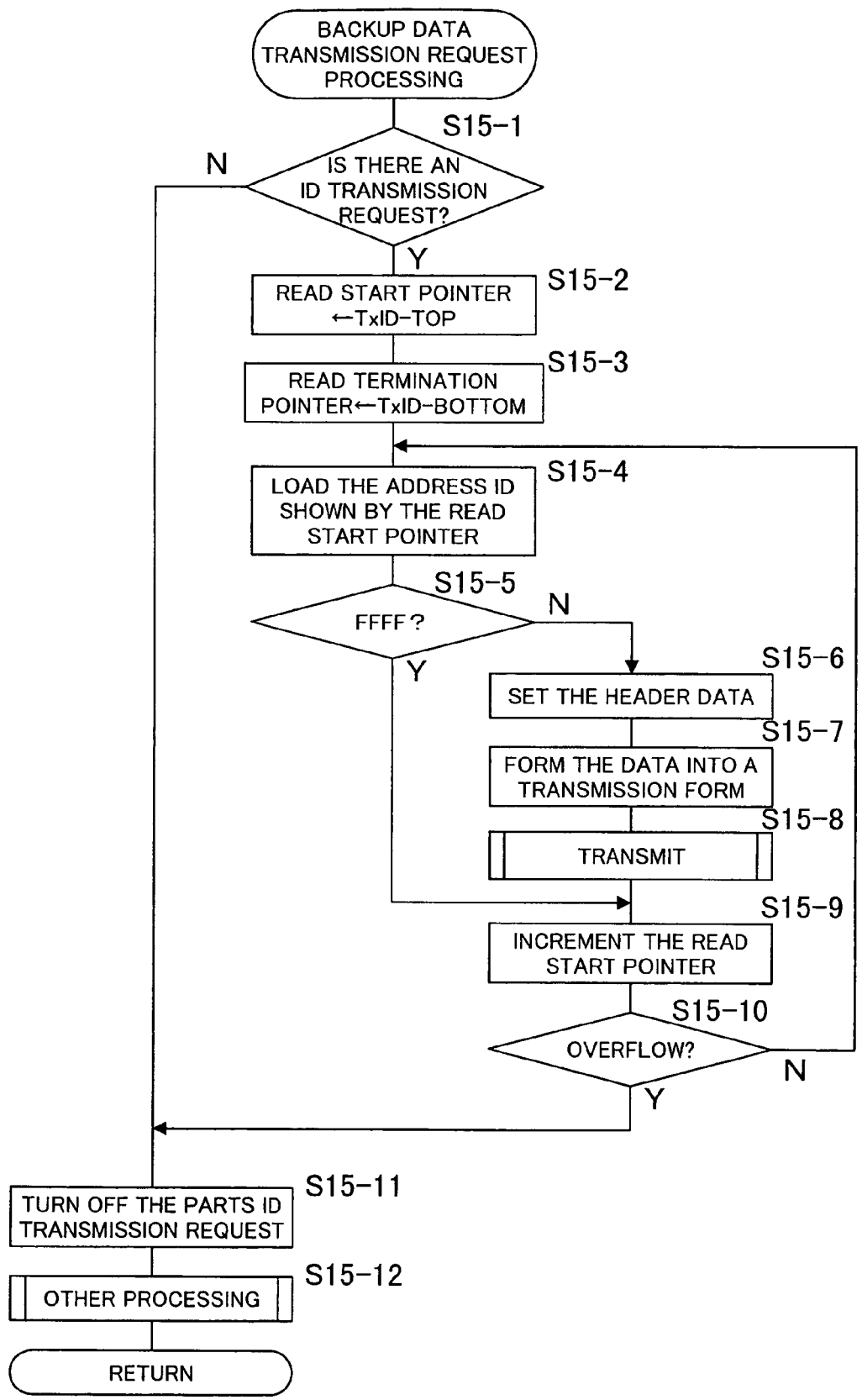
FIG. 17 is a flowchart showing the backup data transmission request processing in FIG. 15B.

FIG. 17 is a flowchart of the backup data transmission request processing in S13-12 shown in FIG. 15B.

In this processing, the part ID specified by the copying machine 4 is given to the center, and the backup data of the center is transmitted to the data terminal 1 in response to the given signal to the center. By this processing, the copying machine 4 can obtain a new part data, resulting in a continuous management of the part even if the part has been used in a plurality of apparatuses.

In S15-1, it is judged whether or not there is a part ID transmission request. In this embodiment, it is judged whether or not the part ID exits in the part ID transmission buffer shown in FIG. 14.

If there is a part ID transmission request (YES in S15-1), in S15-2, the top address (TxID-top) of the part ID transmission buffer shown in FIG. 14 is set as a read start pointer. Then, in S15-3, the bottom address (TxID-bottom) of the part ID transmission buffer as a read termination pointer. In S15-4, the content of the address shown by the read start pointer is loaded.

Subsequently, in S15-5, it is judged whether or not the read out part ID is invalid (FFFF). If invalid (YES in S15-5), the routine proceeds to S15-9. If not invalid (i.e., valid) (NO in S15-5), in S15-6, the header data for requesting the backup data transmission is set. Then, in S15-7, the data is formed into a transmission format and then transmitted to the center in S15-8.

In S15-9, in order to load the subsequent part ID, the read start pointer is incremented. In S15-10, it is judged whether or not the read start pointer exceeds the read termination pointer (the read start pointer is overflowed). If it does not exceed (NO in S15-10), the routine returns to S15-4 to load the content (part ID) of the subsequent address, and the part ID is transmitted to the center side similarly to the above. By repeating this processing, the part ID in the part ID transmission buffer is transmitted to the center side.

If the read start pointer exceeds the read termination pointer (YES in S15-10), it means that all of the data in the part ID transmission buffer have been transmitted. Accordingly, in S15-11, the part ID transmission request is turned off so as not for the module to operate when not required. In this embodiment, the part ID transmission buffer is cleared. Then, in S15-12, other processing is executed. Thereafter, the routine returns.

Thus, the "backup data requesting signal" for each part are transmitted to the computer 90 at the center side.

Regarding the backup data transmission request from the terminal apparatus to the center, the requesting signal may be transmitted automatically when a part is exchanged in the terminal apparatus. This enables an accurate management of parts because the backup data is requested quickly when a recycled part is employed, and the integrated data such as the integrating counter value and the integrating timer value, or a new life value can be obtained by return.

Figure 18:
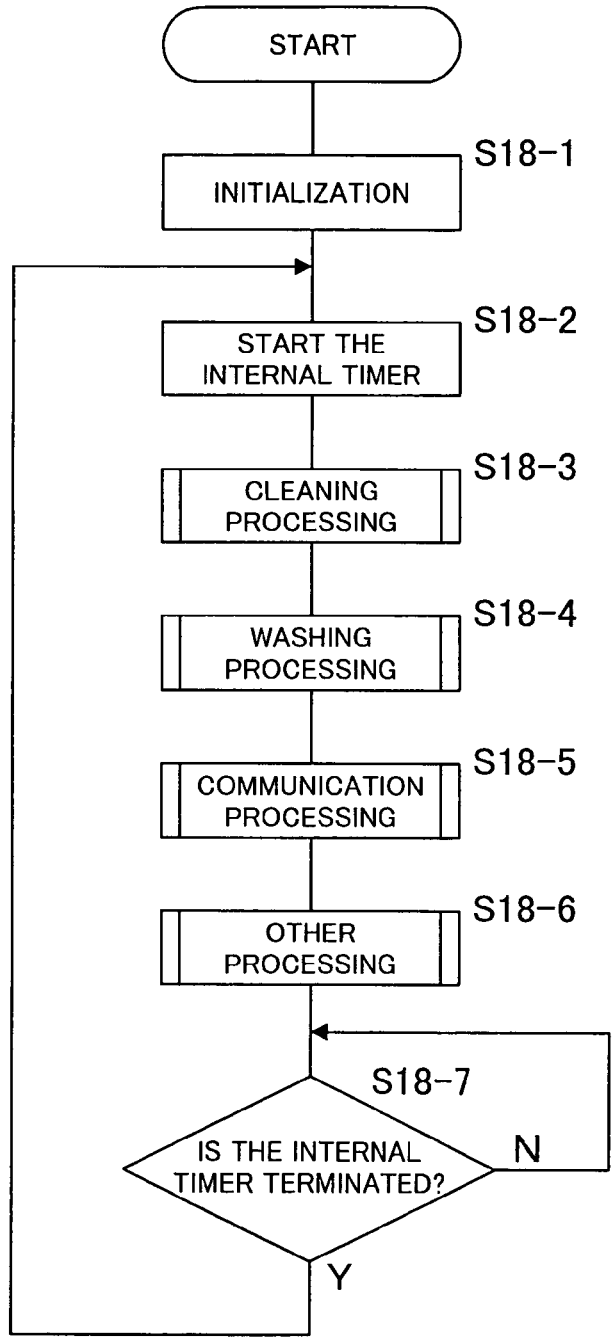
FIG. 18 is a flowchart of a main routine executed by the CPU in the cleaning apparatus.

FIG. 18 is a flowchart of the main routine to be executed by the built-in CPU in the cleaning apparatus 5.

When the power of the cleaning apparatus 5 is turned on and the CPU is reset, the program starts. First, in S18-1, an initializations such as a clear of the RAM, settings of various registers and settings of input/output ports are carried out. In S18-2, the internal timer, which is built in the CPU and defines one routine length set at the initialization, starts.

Then, in S18-3, the predetermined cleaning processing of a part is executed, in S18-4, the predetermined washing processing of a part is executed. Then, in S18-5, a communication processing with the computer 90 at the center side is performed. These processing S18-3 to S18-5 are carried out in a subroutine.

After executing other processing in S18-6, in S18-7, it is judged whether or not the internal timer set in S18-2 is terminated. If it is judged that the internal timer is terminated (YES in S18-7), one routine terminates, and the routine returns to S18-2. If it is judged that the internal timer is not terminated (NO in S18-7), the routine remains S18-7.

Figure 19:
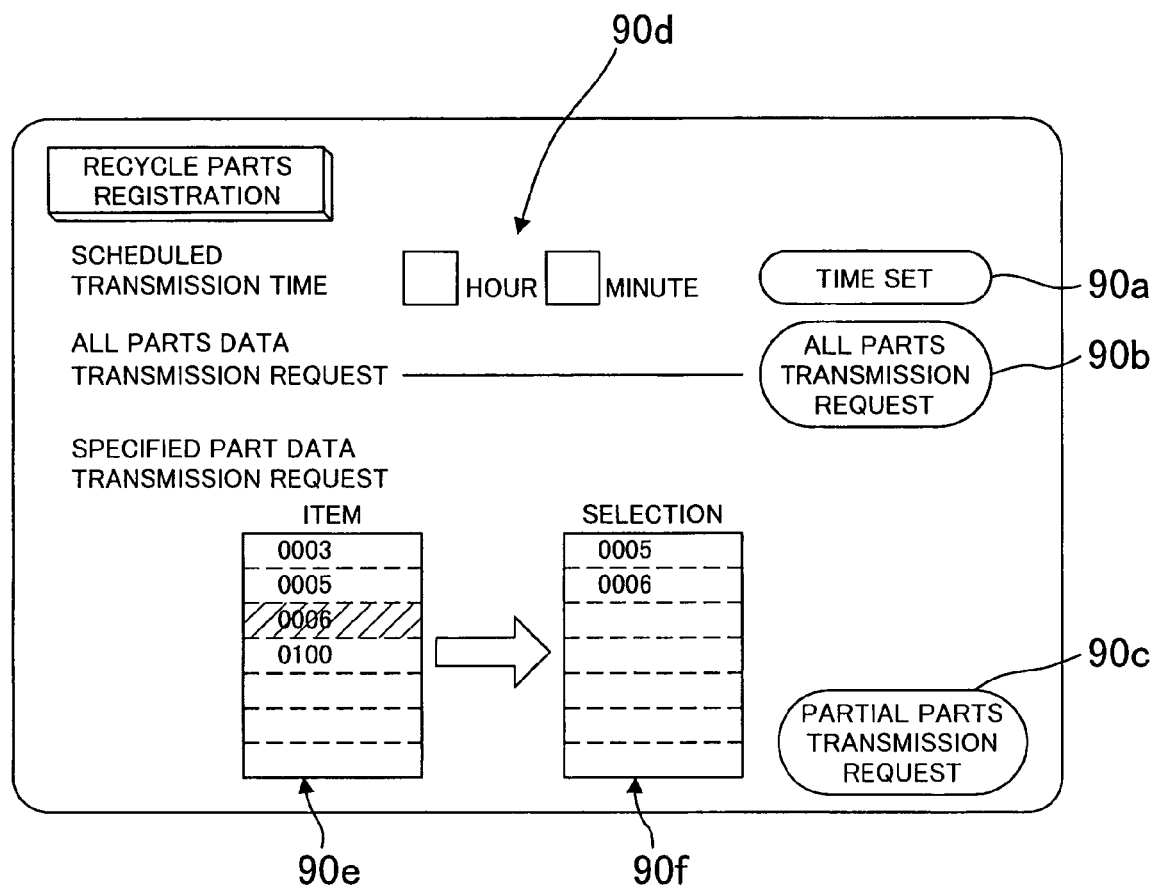
FIG. 19 is a monitor screen at the time of the recycle parts registration by the computer at the center side.

FIG. 19 shows a monitor screen of the computer 90 at the center side, and particularly shows the screen at the time of the recycle parts registration.

In this screen, the reference numeral 90a denotes a time set key to set the time for requesting the recycle data transmission of the part to the copying machine 4. The reference numeral 90b denotes all parts transmission request key to request that the data terminal 1 transmits all parts data of the copying machine. The reference numeral 90c denotes a partial parts transmission request key to request a transmission of a specific part data. These three keys function by depressing a mouse.

The reference numeral 90d shows a scheduled transmission time display area for displaying the time for requesting the parts data transmission. In the area, the time input by a keyboard is displayed, and the display is fixed by depressing the aforementioned time set key 90a.

The reference numeral 90e shows an item display area in which the list of the parts equipped in the copying machine is displayed. In the item area within the item display area 90e, a part ID such as 0003, 0005, 0006 and 0100 is displayed. This shows that the parts shown by these ID are equipped in the copying machine 4.

The reference numeral 90f shows a selection display area in which the part IDs selected among the part IDs in the item area of the item display area 90e are displayed. When a mouse is depressed with a cursor placed on the part ID shown in the item area of the item display area, the content is reversely displayed (e.g. 0006 in 90e shown in FIG. 19) and it is displayed in the item area of the selection display area 90f.

The aforementioned each display area 90d, 90e, 90f is set as an active area whose display content can be changed. The change of the display contents can be performed by an input operation such as a keyboard operation.

The remaining display area other than the aforementioned area is a fixed display area in which a mouse input and/or a keyboard input is not reflected.

FIG. 20 shows the contents of the RAM 97 of the computer 90 at the center side.

Data of a number of parts transmitted from the data terminal 1 are registered in the RAM.

FIG. 21 shows the definition of the transmitting/receiving format among the center, the data terminal and cleaning apparatus.

In this embodiment, the transmitting format from the data terminal 1 to the center has three formats including (1-1) a format at the time of the backup data transmission request, (1-2) a format at the time of the recycle data transmission and (1-3) a format at the time of the prohibition notice of a terminated part. The format at the time of the backup data transmission request is divided into two parts, the header data and the part ID. The format at the time of the recycle data transmission is divided into four parts, the header data, the part ID, the integrating counter and the integrating timer. The format at the time of the prohibition notice is divided into two parts, the header data and the part ID.

On the other hand, the transmitting format from the center side to the data terminal has four formats including (2-1) a format at the time of the all parts data transmission request, (2-2) a format at the time of the specified parts data transmission request, (2-3) a format at the time of the backup data transmission request and (2-4) a format at the time of the life value transmission. The format at the time of the all parts data transmission request includes only the header data. The format at the time of the specified parts data transmission request is divided into two parts, the header data and the part ID. The format at the time of the backup data transmission request is divided into four parts, the header data, the part ID, the integrating counter and the integrating timer. The format at the time of the life value transmission is divided into four parts, the header data, the part ID, the counter life value and the timer life value.

The format transmitted from the cleaning apparatus 5 is (3-1) a format transmitted to the center side at the time of the cleaning termination signal. This format is divided into two parts, the header data showing the termination of cleaning and the part ID whose cleaning is completed.

In this embodiment, the header data are defined as follows:
  10: backup data transmission request from the data terminal;
  11: recycle data transmission from the data terminal;
  20: all parts data transmission request from the center side;
  21: specific part data transmission request;
  22: backup data transmission; and
  30: cleaning termination signal transmission.

Figure 22:
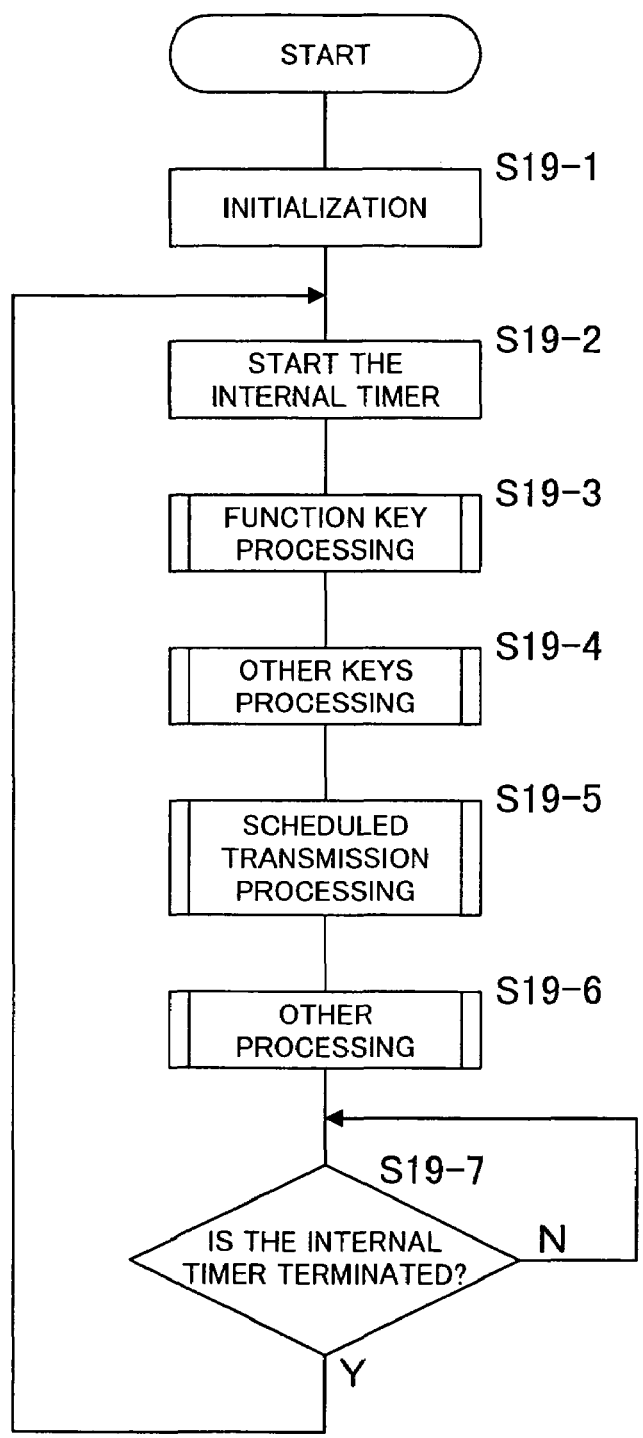
FIG. 22 is a main flowchart of the computer at the center side.

FIG. 22 is a main flowchart of the computer 90 at the center side.

When the power of the computer 90 at the center side is turned on and the CPU 91 is reset, the program starts. First, in S19-1, an initialization of, for example, settings of the input/output ports and the RAM and environment settings of the modem 72 and the printer is performed. In the environment setting of the modem 72, the initial setting of, for example, a dial mode and/or an automatic receiving as well as a communication system are set. The communication system includes, for example, a CCITT system and a BELL system.

In S19-2, the internal timer, which is built in the CPU and defines one routine length set at the initial setting, starts.

Subsequently, in S19-3, the function key processing is executed. This processing is executed when the key on the keyboard 93 is depressed.

Then, in S19-4, the other key processing is executed. In this processing, the processing for keys other than the function keys among keys provided on the keyboard is executed. Concretely, the other keys include ten keys and A-Z keys.

In S19-5, the scheduled transmission processing is executed. This is a processing for urge the data terminal 1 (copying machine) to transmit the data on time.

After other processing is executed in S19-6, in S19-7, it is judged whether or not the internal timer set in S19-2 is terminated. If it is judged that the internal timer is terminated (YES in S19-7), one routine terminates, and the routine returns to S19-2. If it is judged that the internal timer is not terminated (NO in S19-7), the routine remains S19-7.

Figure 23:
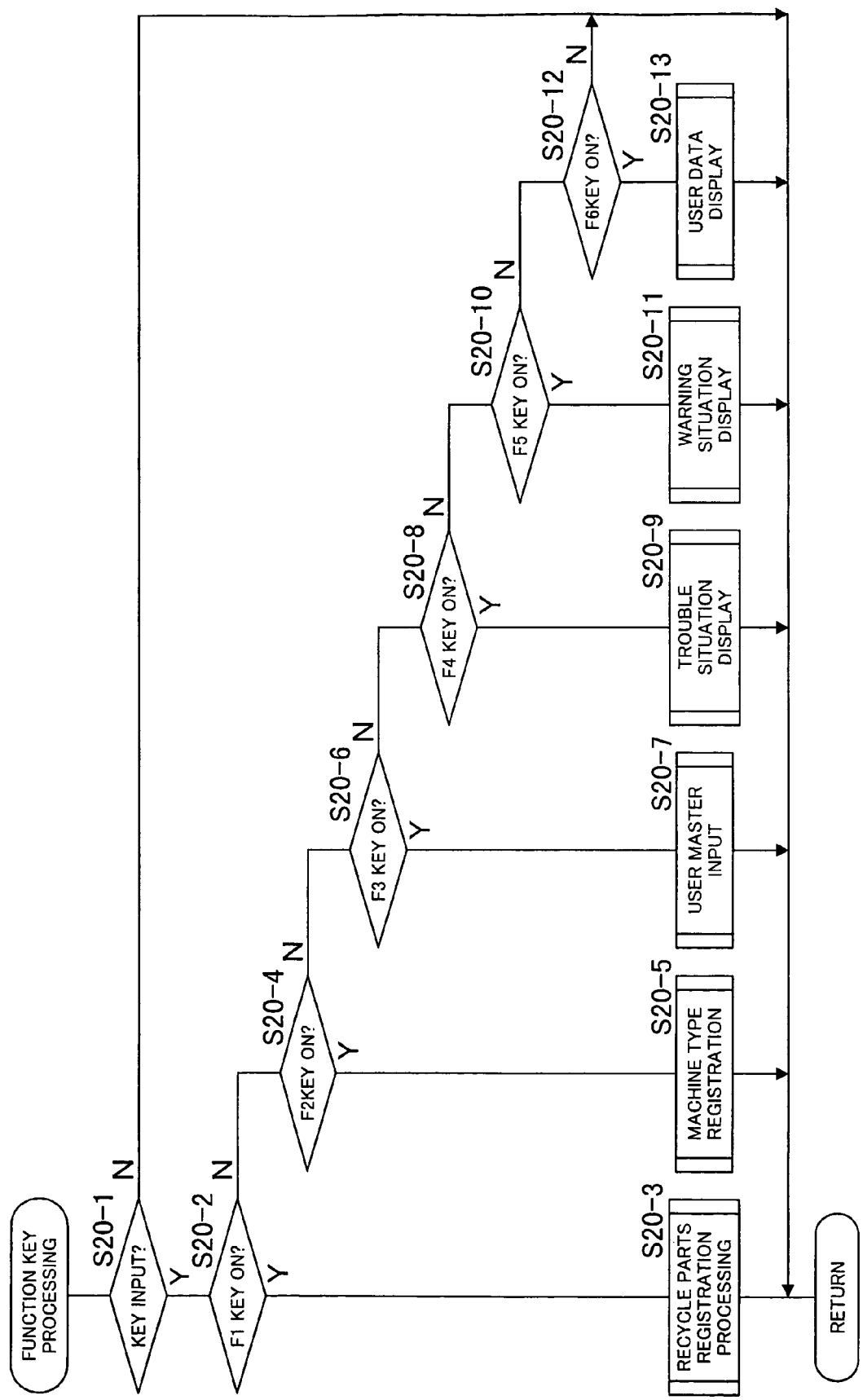
FIG. 23 is a flowchart showing the function key processing shown in FIG. 22.

FIG. 23 is a flowchart showing a function key processing in S19-3 shown in FIG. 22.

In S20-1, it is judged whether or not there is a key input. If there is no key input (NO in S20-1), the routine returns. If there is a key input (YES in S20-1), in S20-2, it is checked whether or not the F1 key is on.

If the F1 key is on (YES in S20-2), in S20-3, the recycle parts registration processing is executed. In this processing, the following settings are registered.
  a setting of the scheduled transmission time against the terminal apparatus (copying machine 4);
  a setting of the command transmission against the terminal apparatus;
  a data transmission request of all parts equipped to the terminal apparatus; and
  an identification of the specified part equipped to the terminal apparatus and a data transmission request of the part.

In S20-2, if the F1 key is not on (NO in S20-2), in S20-4, it is judged whether or not the F2 key is on. If the F2 key is on (YES in S20-4), in S20-5, an accept mode of the machine type registration is set. In other words, a new registration of, for example, the name of machine type, the number of items of the element data, the name of each element data and the standard threshold of each element data, is accepted.

In S20-4, if the F2 key is not on (NO in S20-4), in S20-6, it is judged whether or not the F3 key is on. If the F3 key is on (YES in S20-6), in S20-7, a registration accept mode of the user master is set. In other words, a new registration of, for example, the user name, the address, the telephone number, the machine type name, the board plate name and the scheduled transmission data and time, is accepted. Furthermore, the ID of the data terminal 1 (DTID) is automatically set.

In S20-6, if the F3 key is not on (NO in S20-6), in S20-8, it is judged whether or not the F4 key is on. If the F4 key is on (YES in S20-8), in S20-9, the trouble situation is displayed. In other words, the user information of the copying machine which transmitted an emergency signal (the user name, the address, the telephone number and the machine type) and the troubled date and time are displayed on the display 92 together with the details of the trouble. In the meantime, the number of troubles is always displayed on the corner of the display 92 independently of the F4 key operation.

In S20-8, if the F4 key is not on (NO in S20-8), in S20-10, it is judged whether or not the F5 key is on. If the F5 key is on (YES in S20-10), in S20-11, the warning situation is displayed. In other words, the user information of the copying machine which transmitted an emergency signal and the like are displayed on the display 92 together with the contents of the warning. In the meantime, the number of warnings is always displayed on the corner of the display 92 independently of the F5 key operation.

In S20-10, if the F5 key is not on (NO in S20-10), in S20-12, it is judged whether or not the F6 key is on. If the F6 key is on (YES in S20-12), in S20-13, the user data display mode appears. In other words, when the user is selected, the user information is displayed on the display 92. Furthermore, when the submenu is selected, the counted values of various counters of the user's copying machines (the total counter, the paper size counter, the JAM counter, the trouble counter and the PM counter) and the element data are displayed by month or by item.

Related to this embodiment is the "recycle parts registration processing" at the time of turning on the F1 key, which will be detailed with reference to the flowchart shown in FIG. 24.

FIG. 24A is a main flowchart of the recycle parts registration processing S203 shown in FIG. 23. This processing includes the screen update processing S21-A and the registration processing S21-B.

FIG. 24B is a flowchart showing the contents of the screen update processing S21-A. This processing will be explained with reference to FIG. 19.

In S21-1, it is judged whether or not the cursor is located in the scheduled transmission time display area 90d (see FIG. 19). If it is located in the area (YES in S21-1), it is judged whether or not there is a keyboard input. If there is a time input by the keyboard input (YES in S21-2), in S21-3, the content of the display area 90d is updated, and the routine returns. If there is no time input by the keyboard input (NO in S21-2), the routine returns.

In S21-1, if the cursor is not located in the scheduled transmission time display area 90d (NO in S21-1), in S21-4, it is judged whether or not the cursor is located in the specific parts data transmission request display area. If it is located in the area (YES in S21-4), in S21-5, it is judged whether or not the mouse is depressed. If the mouse is depressed (YES in S21-5), in S21-6, it is judged whether or not the cursor is located in the item area when the mouse is depressed. If the cursor is located in the item area (YES in S21-6), in S21-7, in order to show the selection, the selected item (part ID) is reversely displayed.

Then, in S21-8, the selected item is displayed in the item area of the selection display item area 90f, and the routine returns.

In cases where the mouse is not depressed in S21-5 (NO in S21-5) and the mouse is not depressed in the item area in S21-6 (NO in S21-6), the routine returns.

In S21-4, if the cursor is not located in the specified parts data transmission request display area (NO in S21-4), in S21-9, the cursor is set so as to be located in the scheduled transmission time display area. Then, the routine returns. That the routine proceeds to the S21-9 means the case where the cursor is not displayed, which should not be occurred. However, the aforementioned processing is a processing for displaying the cursor in the scheduled transmission time display area as a default display in case of emergency.

By the aforementioned processing, the display content of the display area 90d-90f in FIG. 19 is updated.

FIG. 25A is a flowchart of the registration processing S21-B shown in FIG. 24A. This processing relates to a key processing shown in 90a-90c of FIG. 19.

In S22-1, it is judged whether or not the mouse is depressed. If the mouse is not depressed (NO in S22-1), the routine returns. If depressed (YES in S22-1), in S22-2, it is judged whether or not the time set key 90a is depressed. If the time set key 90a is depressed (YES in S22-2), in S22-3, the displayed contents of the scheduled transmission time display area 90d are loaded. Then, in S22-4, the displayed contents are stored in its memory as the transmission time at the scheduled transmission.

In S22-2, if the time set key 90a is not depressed (NO in S22-2), in S22-5, it is judged whether or not all parts transmission request key 90b is depressed.

If all parts transmission request key 90b is depressed (YES in S22-5), in S22-6, "20" which means all parts data transmission request transmitted by the center is set in accordance with the aforementioned definition as the header data, and then transmitted to the data terminal 1 in S22-12.

On the other hand, in S22-5, if all parts transmission request key 90b is not depressed (NO in S22-5), in S22-7, it is judged whether or not partial parts transmission request key 90c is depressed. If it is not depressed (NO in S22-7), the routine returns. If it is depressed (YES in S22-7), in S22-8, the contents of the selected display area 90f is loaded.

Then, in S22-9, the data is formed into a transmission form. In S22-10, "21" which means the specified parts data transmission request transmitted by the center is set in accordance with the aforementioned definition as the header data, and then transmitted to the data terminal 1 in S22-11.

By the aforementioned processing, the processing at the time of depressing each key 90a-90c shown in FIG. 19 is executed.

FIG. 25B is a flowchart showing the contents of the scheduled transmission processing S19-5 in FIG. 22.

In S22-13, the internal clock of the management apparatus (computer 90) of the center is loaded.

Next, in S22-14, the internal clock is compared with the time data stored in S22-4. If it coincides with the data (YES in S22-14), in S22-15, "20" which means all parts data transmission request transmitted by the center is set as the header data, and then transmitted to the data terminal 1 in S22-16. If it does not coincide with the data (NO in S22-14), the routine returns without executing the processing.

By this processing, the functions for periodically requesting data transmission from the management apparatus to the terminal apparatus can be attained.

Figure 26:
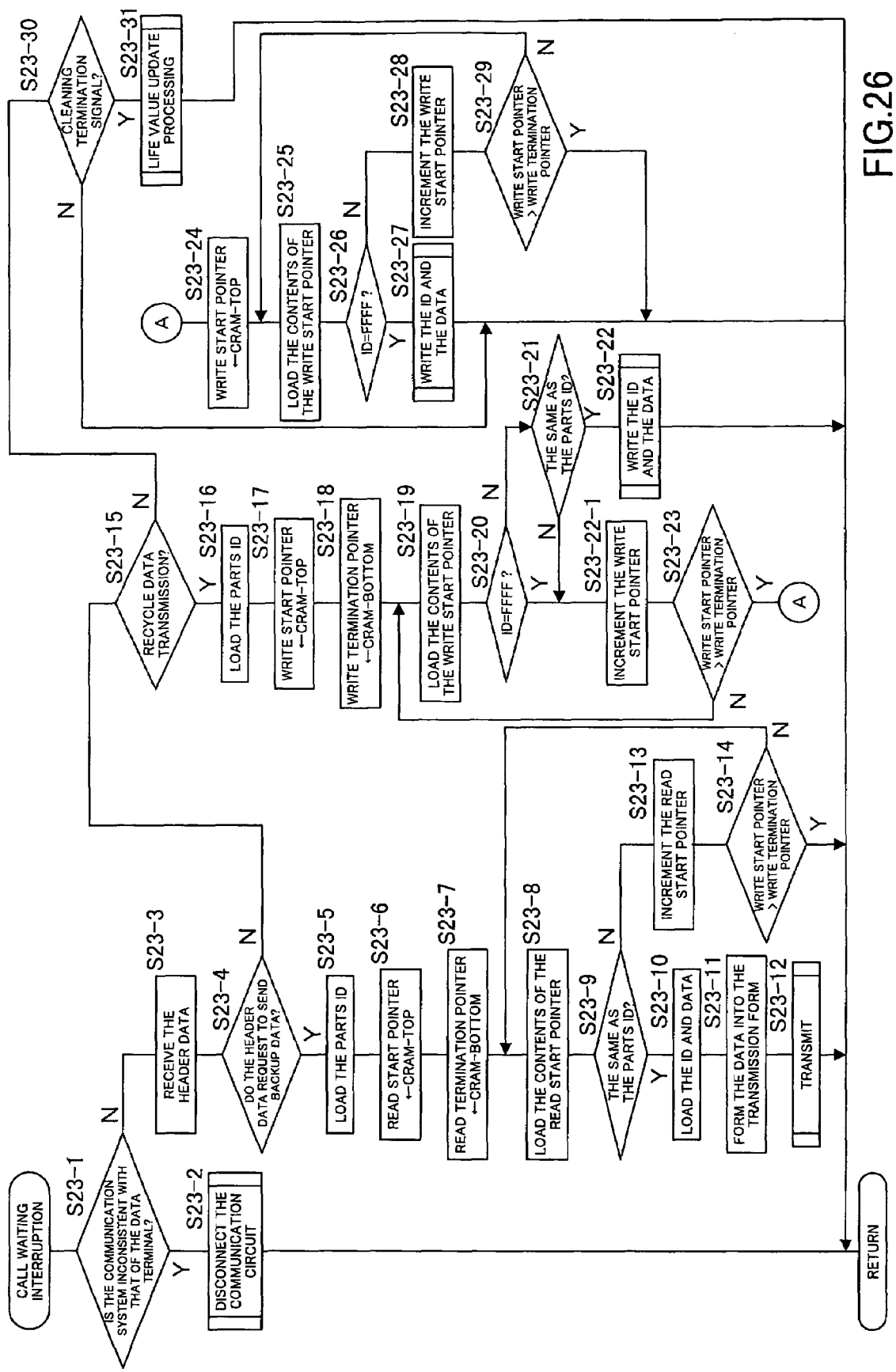
FIG. 26 is a flowchart concerning the interruption processing executed by the center side computer at the time of receiving data from the data terminal.

FIG. 26 is a flowchart concerning an interruption processing at the time of receiving data from the data terminal 1 to be executed by the computer 90 as a managing apparatus.

By this interruption processing, when the data terminal 1 transmits data, the contents of the memory of the managing apparatus are transmitted or updated. Furthermore, when a cleaning termination signal is transmitted from the cleaning apparatus, the life value stored in the memory of the managing apparatus is updated. This processing is executed when the header data transmitted from the data terminal 1 is 10 (backup data transmission request), 11 (recycle data) and 30 (termination of cleaning).

In S23-1, it is judged whether or not the communication system is inconsistent with that of data terminal 1. If inconsistent (YES in S23-1), in S23-2, the communication circuit is disconnected. If consistent (NO in S23-1), in S23-3, the header data transmitted is loaded.

Then, in S23-4, it is judged whether or not the header data is the backup data transmission request (header data 10). If it is the backup data transmission request (YES in S23-4), in S23-5, the part ID is loaded. Then, in S23-6, the top address (Cram-top) of the RAM of the computer 90 shown in FIG. 12 is set as the read start pointer. In S23-7, the bottom address (Cram-bottom) of the RAM is set as the read termination pointer. Then, in S23-8, the contents of the address shown by the read start pointer is loaded.

In S23-9, it is judged whether or not the loaded part ID coincides with the part ID requested in S23-5. If coincides (YES in S23-9), in S23-10, the part ID and each data are loaded. Then, in S23-11, the read out data is formed into a transmission format and transmitted to the data terminal 1 in S23-12. Then, the routine returns.

As a result of the judgement in S23-9, if the part ID is not inconsistent (NO in S23-9), in S23-10, the read start pointer is incremented in S23-10 in order to load the subsequent part ID. Then, it is judged whether or not the read start pointer exceeds the read termination pointer in S23-14. If it does not exceed (NO in S23-14), the routine returns to S23-8 to load the contents of the subsequent address (part ID). If the read start pointer exceeds the read termination pointer (YES in S23-14), it means that there is no consistent part ID in the RAM. Accordingly, it is judged that there is no counter to be incremented. Then, the routine returns. Thus, the data (part ID) is searched from the RAM of the computer 90.

As a result of the judgement in S23-4, if it is judged that the header data is not requesting the backup data transmission (NO in S23-4), in S23-15, it is judged whether or not the header data is requesting the recycle data transmission. If it is not requesting the recycle data transmission (NO in S23-15), in S23-30, it is judged whether or not it is a cleaning termination signal transmitted by the cleaning apparatus 5. If it is a cleaning termination signal (YES in 23-30), in S23-31, the life value of the part is updated since the life of the part cleaned by the cleaning apparatus 5 has prolonged. This processing will be detailed later. If it is not a cleaning termination signal (NO in S23-30), the routine returns.

In S23-15, if it is judged that it is requesting the recycle data transmission (YES in S23-15), in S23-16, the part ID is loaded. In S23-17, the top address (Cram-top) of the RAM shown in FIG. 20 is set as a read start pointer. Then, in S23-18, the bottom address (Dram-bottom) of the RAM is set as a read termination pointer. In S23-19, the contents of the address shown by the read start pointer is loaded.

In S23-20, it is judged whether or not the read out part ID is invalid (FFFF). If not invalid (NO in S23-20), in S23-21, it is judged whether or not the part ID coincides with the part ID loaded in S23-16. If it coincides with the part ID (YES in S23-21), in S23-22, the part ID and the data are written in the RAM of the computer 90. If it doe not coincide with the part ID (NO in S23-21), the routine proceeds to S23-22-1.

On the other hand, in S23-20, if the loaded part ID is invalid (YES in S23-20), the routine proceeds to S23-22-1.

In S23-22-1, the read start pointer is incremented. Then, in S23-23, it is judged whether or not the read start pointer exceeds the read termination pointer. If it does not exceed (NO in S23-23), the routine returns to S23-19 to load the content (part ID) of the subsequent address. If the read start pointer exceeds the read termination pointer (YES in S23-23), the routine proceeds to S23-24.

Thus, in a case where the recycle data is transmitted from the data terminal 1 and is related to the part ID previously stored in the computer 90 at the center side, the contents are updated.

On the other hand, in a case where the recycle data is transmitted from the data terminal 1 and the part ID is not previously stored in the computer 90 at the center side, the judgement in S23-21 of all addresses is NO, and the routine proceeds to S23-24. In this case, an empty area to be used for a new writing is searched and the data is written therein.

In S23-24, the top address (Cram-top) of the RAM is set again as a write start pointer. Then, in S23-25, the contents of the address shown by the write start pointer is loaded. Next, in S23-26, it is judged whether or not the loaded part ID is invalid (FFFF), i.e., the area may be used as a new writing area. If invalid (YES in S23-26), since the area can be used as a new writing area, in S23-27, the data is stored in the area.

On the other hand, if not invalid (NO in S23-26), the next empty area is searched. In other words, in S23-28, the read start pointer is incremented. Then, in S23-29, it is judged whether or not the read start pointer exceeds the read termination pointer. If it does not exceed the read termination pointer (NO in S23-29), the routine returns to S23-25 to load the contents of the subsequent address. If it exceeds the read termination pointer (YES in S23-29), since no empty area is available, the routine returns.

Thus, an empty area is searched for a new part ID, and the new part ID is written in an empty area found. Accordingly, there is no risk to destroy the existing data.

Figure 27:
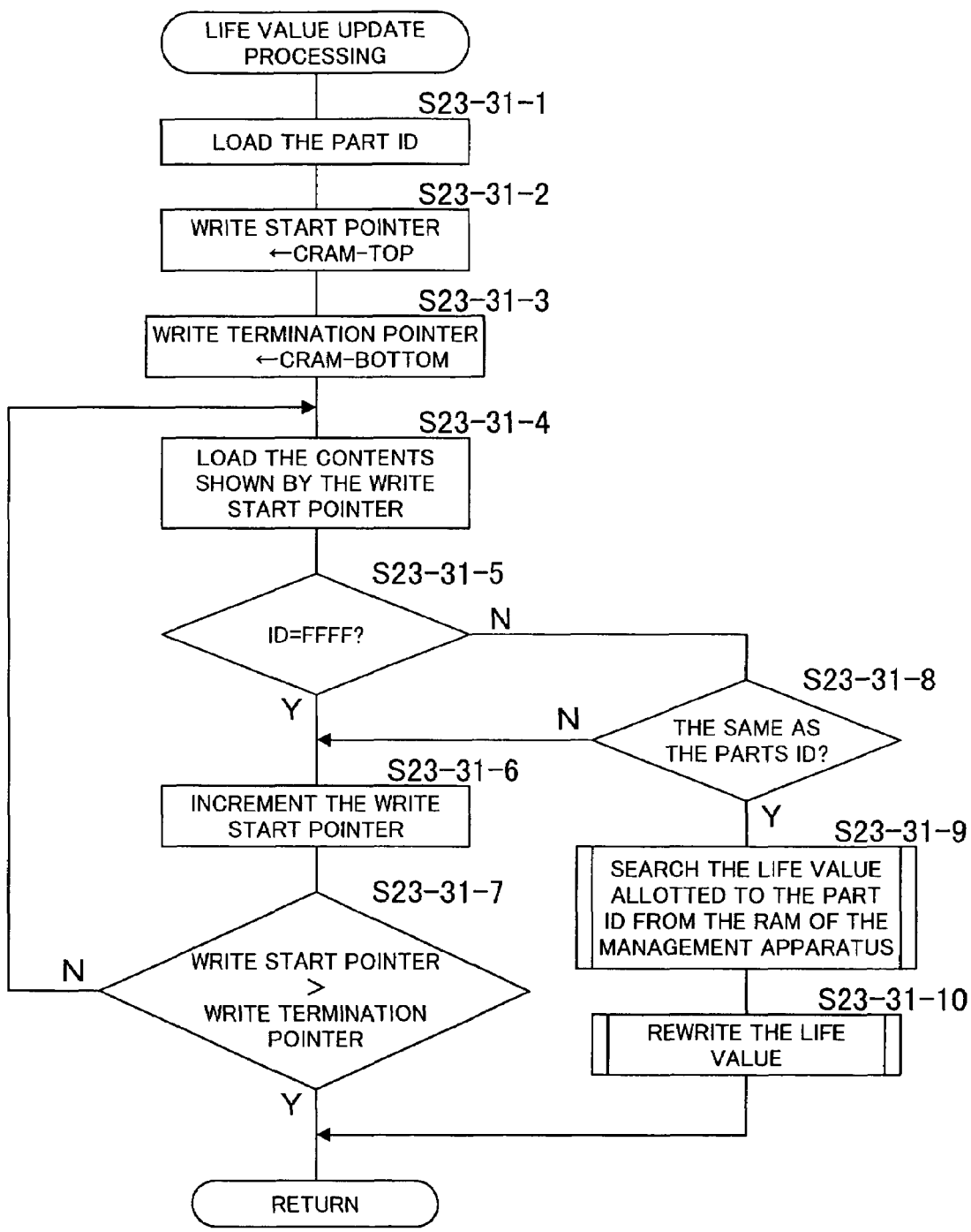
FIG. 27 is a flowchart showing the content of the life value update processing shown in FIG. 26.

FIG. 27 is a flowchart showing the content of the life value updating processing S23-31 shown in FIG. 26.

In this processing, in S23-31-1, the part ID transmitted from the cleaning apparatus 5 is loaded. Then, in S23-31-2, the top address (Cram-top) of the RAM shown in FIG. 20 is set as a write start pointer. In S23-31-3, the bottom address (Cram-bottom) of the RAM is set as a write termination pointer. Then, in S23-31-5, the content shown by the read start pointer is loaded.

In S23-31-5, it is judged whether or not the loaded part ID is invalid (FFFF). If invalid (NO in S23-31-5), in S23-31-8, it is judged whether or not the part ID coincides with the part ID loaded in S23-31-1. If it coincides with the part ID loaded (YES in S23-31-8), in S23-31-9, the life value allotted to the part ID after cleaning is searched from the RAM (computer 90) of the management apparatus to obtain. Then, in S23-31-10, the life value is updated to the obtained value.

On the other hand, in S23-31-8, if it does not coincide with the part ID loaded (NO in S23-31-8), the routine proceeds to S23-31-6. Furthermore, in S23-31-5, if the loaded part ID is invalid (YES in S23-31-5), the routine proceeds to S23-31-6.

In S23-31-6, the read start pointer is incremented. Then, in S23-31-7, it is judged whether or not the read start pointer exceeds the read termination pointer. If it does not exceeds the read termination pointer (NO in S23-31-7), the routine returns to S23-31-4 to load the content (part ID) of the subsequent address. If it exceeds the read termination pointer (YES in S23-31-7), the routine returns.

Thus, the life value of the part which is cleaned is updated. Therefore, when the part is recycled, the life is judged based on the updated life value.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A parts-management system comprising:
   a terminal apparatus; and
   a management apparatus for communicating with said terminal apparatus,
   wherein said terminal apparatus includes:
   a first memory which stores identification information of each part used in said terminal apparatus and an operation value corresponding to an operation of each part in a mutually related manner, and
   a controller of said terminal apparatus which performs a predetermined operation processing corresponding to an operation of each part and updates said operation value stored in said first memory when said part operates, wherein said controller of said terminal apparatus updates, based on said identification information and said operation value of each part transmitted from said management apparatus, the corresponding operation value of said identification information stored in said first memory;
   a first transmitter which transmits said identification information of each part and said operation value corresponding to said identification information to said management apparatus; and a second transmitter which transmits a request signal for requesting a transmission of said operation value for at least one part, and wherein said management apparatus includes:

a second memory which stores said identification information of each part and said operation value each sent by said first transmitter in a mutually related manner;

a third transmitter which transmits said identification information and said operation value each stored in said second memory to said terminal apparatus in response to said request signal, and wherein said second memory is configured to store a life value showing a total life of each part.

2. The parts-management system as recited in claim 1, wherein said management apparatus further includes a fourth transmitter which transmits said life value to said terminal apparatus.

3. The parts-management system as recited in claim 2, wherein said terminal apparatus further includes a fifth transmitter which compares said operation value with said life value and transmits identification information of a part whose operation value exceeds said life value.

4. The parts-management system as recited in claim 1, wherein said second transmitter transmits a request signal for an equipped part when said part is equipped to said terminal apparatus.

5. The parts-management system as recited in claim 1, wherein said terminal apparatus is an image forming apparatus for forming an image on a sheet.

6. A method of managing parts for managing parts used in a terminal apparatus while conducting a data communication between said terminal apparatus and a management apparatus, wherein said terminal apparatus includes a first memory which stores identification information of each part used in said terminal apparatus and an operation value corresponding to an operation of each part in a mutually related manner, the method including the steps of:

performing a predetermined operation processing corresponding to an operation of each part to update said operation value stored in said first memory of said terminal apparatus when said part operates;

transmitting said identification information of each part and said operation value corresponding to said identification information from said terminal apparatus to said management apparatus;

storing in a second memory provided on said management apparatus said identification information of each part and said operation value transmitted from said terminal apparatus in a mutually related manner;

transmitting a request signal for requesting a transmission of said operation value for at least one part from said terminal apparatus to said management apparatus;

transmitting said identification information and said operation value for said requested part stored in said second memory of said management apparatus from said management apparatus to said terminal apparatus in response to said request signal;

updating said operation value for said requested part stored in said first memory of said terminal apparatus based on said identification information and said operation value for said requested part transmitted from said management apparatus, and wherein said second memory of said management apparatus stores a life value showing a life of each part.

7. The method of managing parts as recited in claim 6, further including the step of:

transmitting said life value from said management apparatus to said terminal apparatus.

8. The method of managing parts as recited in claim 7, further including the step of:

comparing said operation value with said life value and transmitting said identification information of a part whose operation value exceeds said life value from said terminal apparatus to said management apparatus.

9. The method of managing parts as recited in claim 6, further including the step of:

inputting a signal concerning a cleaning of parts into said management apparatus and updating said stored life value in response to said signal.

10. The method of managing parts as recited in claim 6, wherein, in said step of transmitting said request signal, a request signal for a part equipped to said terminal apparatus is transmitted when said part is equipped to said terminal apparatus.

11. The method of managing parts as recited in claim 6, wherein said terminal apparatus is an image forming apparatus for forming an image on a sheet.

* * * * *